United States Patent
Hidaka et al.

(10) Patent No.: US 11,901,771 B2
(45) Date of Patent: Feb. 13, 2024

(54) ROTATING ELECTRIC MACHINE

(71) Applicant: Mitsubishi Electric Corporation, Tokyo (JP)

(72) Inventors: Yuki Hidaka, Tokyo (JP); Hideaki Arita, Tokyo (JP); Taiga Komatsu, Tokyo (JP); Shohei Fujikura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 364 days.

(21) Appl. No.: 17/432,093

(22) PCT Filed: Apr. 10, 2019

(86) PCT No.: PCT/JP2019/015649
§ 371 (c)(1),
(2) Date: Aug. 19, 2021

(87) PCT Pub. No.: WO2020/208749
PCT Pub. Date: Oct. 15, 2020

(65) Prior Publication Data
US 2022/0200374 A1    Jun. 23, 2022

(51) Int. Cl.
*H02K 1/276* (2022.01)
*H02K 1/22* (2006.01)
(Continued)

(52) U.S. Cl.
CPC ............ *H02K 1/276* (2013.01); *H02K 1/223* (2013.01); *H02K 1/27* (2013.01); *H02K 1/2766* (2013.01); *H02K 13/02* (2013.01)

(58) Field of Classification Search
CPC ...... H02K 1/276; H02K 11/21; H02K 21/042; H02K 1/223; H02K 21/14; H02K 1/2766;
(Continued)

(56) References Cited

U.S. PATENT DOCUMENTS

| 8,772,994 B2* | 7/2014 | Feng | H02K 1/32 310/156.53 |
|---|---|---|---|
| 2012/0248920 A1* | 10/2012 | Takahashi | H02K 1/32 29/598 |
| 2015/0318774 A1 | 11/2015 | Tremelling et al. | |

FOREIGN PATENT DOCUMENTS

| JP | 9-182334 A | 7/1997 |
| JP | 9-233750 A | 9/1997 |

(Continued)

OTHER PUBLICATIONS

International Search Report and Written Opinion dated Jul. 9, 2019, received for PCT Application PCT/JP2019/015649, Filed on Apr. 10, 2019, 9 pages including English Translation.
(Continued)

Primary Examiner — Alexander A Singh
(74) Attorney, Agent, or Firm — XSENSUS LLP

(57) ABSTRACT

A rotating electric machine includes a stator and a rotor. The rotor includes a rotor core, an axial end part, and a rotor magnet inserted into an insertion hole formed so as to pass through the rotor core. The axial end part has a recessed portion. The rotor magnet includes a first side surface and a second side surface. The first side surface is fixed to a first inner wall surface of the insertion hole. In a cross section perpendicular to the axial direction, a width of the first inner wall surface is larger than a width of the first side surface. The second side surface is fixed to a second inner wall surface of the recessed portion. In the cross section perpendicular to the axial direction, a width of the second inner wall surface is larger than a width of the second side surface.

11 Claims, 23 Drawing Sheets

(51) Int. Cl.
*H02K 1/27* (2022.01)
*H02K 13/02* (2006.01)

(58) Field of Classification Search
CPC ........ H02K 13/02; H02K 1/27; H02K 1/2706;
H02K 1/272; H02K 1/2726; H02K
1/2733; H02K 1/274; H02K 1/2746;
H02K 1/2753
USPC ........................................ 310/156.56, 156.01
See application file for complete search history.

(56) References Cited

FOREIGN PATENT DOCUMENTS

| | | | |
|---|---|---|---|
| JP | 2002-186236 A | 6/2002 | |
| JP | 2008-220014 A | 9/2008 | |
| JP | 2009-240109 A | 10/2009 | |
| JP | 2012-70549 A | 4/2012 | |
| WO | WO-2016053352 A1 * | 4/2016 | ............. H02K 1/223 |

OTHER PUBLICATIONS

Notice of Reasons for Refusal dated Dec. 10, 2019, received for JP Application 2019-552648, 6 pages Including English Translation.
Extended European search report dated Mar. 4, 2022, in corresponding European patent Application No. 19924565.5, 9 pages.

* cited by examiner

ROTATING ELECTRIC MACHINE

CROSS-REFERENCE TO RELATED APPLICATION

The present application is based on PCT filing PCT/JP2019/015649, filed Apr. 10, 2019, the entire contents of which are incorporated herein by reference.

TECHNICAL FIELD

The present invention relates to a rotating electric machine including a rotor core, and a rotor magnet inserted into an insertion hole formed so as to pass through the rotor core in an axial direction thereof.

BACKGROUND ART

In Patent Literature 1, a brushless DC motor including a stator and a rotor is described. The rotor includes a rotor core, insertion portions formed in the rotor core, permanent magnets respectively embedded in the insertion portions, and a pair of end plates respectively joined to both end surfaces of the rotor core. A pair of gaps are respectively formed on both circumferential sides of each of the permanent magnets so as to extend in a rotation axis direction on the both sides. A flat spring is arranged between at least one of the end plates and the permanent magnet. The flat spring presses the permanent magnet in the rotation axis direction so as to regulate movement of the permanent magnet in a circumferential direction and the rotation axis direction.

CITATION LIST

Patent Literature

[PTL 1] JP 9-182334 A

SUMMARY OF INVENTION

Technical Problem

With the configuration in Patent Literature 1, the gaps are formed on the both circumferential sides of each of the permanent magnets, respectively. Accordingly, without changing a circumferential dimension of each of the insertion portions, a width dimension of each of the permanent magnets can be increased. Thus, even when the width dimension of each of the permanent magnets is changed, a manufacturing mold for the rotor core can be standardized, thereby being capable of suppressing an increase in manufacturing cost of the rotor accompanied with a change in width dimension of each of the permanent magnets. However, in the configuration in Patent Literature 1, a position of each of the permanent magnets in the insertion portion is merely kept by pressing each of the permanent magnets in the rotation axis direction by the flat spring. Therefore, in the configuration in Patent Literature 1, there has been a problem in that it is difficult to stably hold the permanent magnets.

The present invention has been made in order to solve the problem described above, and has an object to provide a rotating electric machine capable of stably holding a rotor magnet while suppressing an increase in manufacturing cost accompanied with a change in dimension of the rotor magnet.

Solution to Problem

According to the present invention, there is provided a rotating electric machine, including: a stator; and a rotor provided so as to be rotatable relative to the stator, wherein the rotor includes: a rotor core; an axial end part provided at an end portion of the rotor core in an axial direction of the rotor; and a rotor magnet that is inserted into an insertion hole formed so as to pass through the rotor core in the axial direction, and is fixed to both of the rotor core and the axial end part, wherein the axial end part has a recessed portion in which an end portion of the rotor magnet in the axial direction is to be inserted, wherein the rotor magnet includes, as side surfaces along the axial direction, a first side surface and a second side surface different from the first side surface, wherein the first side surface is fixed to a first inner wall surface of the insertion hole opposed to the first side surface, wherein in a cross section perpendicular to the axial direction, a width of the first inner wall surface along the first side surface is larger than a width of the first side surface, wherein the second side surface is fixed to a second inner wall surface of the recessed portion opposed to the second side surface, and wherein in the cross section perpendicular to the axial direction, a width of the second inner wall surface along the second side surface is larger than a width of the second side surface.

Advantageous Effects of Invention

According to the present invention, while an increase in manufacturing cost accompanied with the change in dimension of each rotor magnet is suppressed, the rotor magnets can be stably held.

DESCRIPTION OF EMBODIMENTS

First Embodiment

Figure 1:
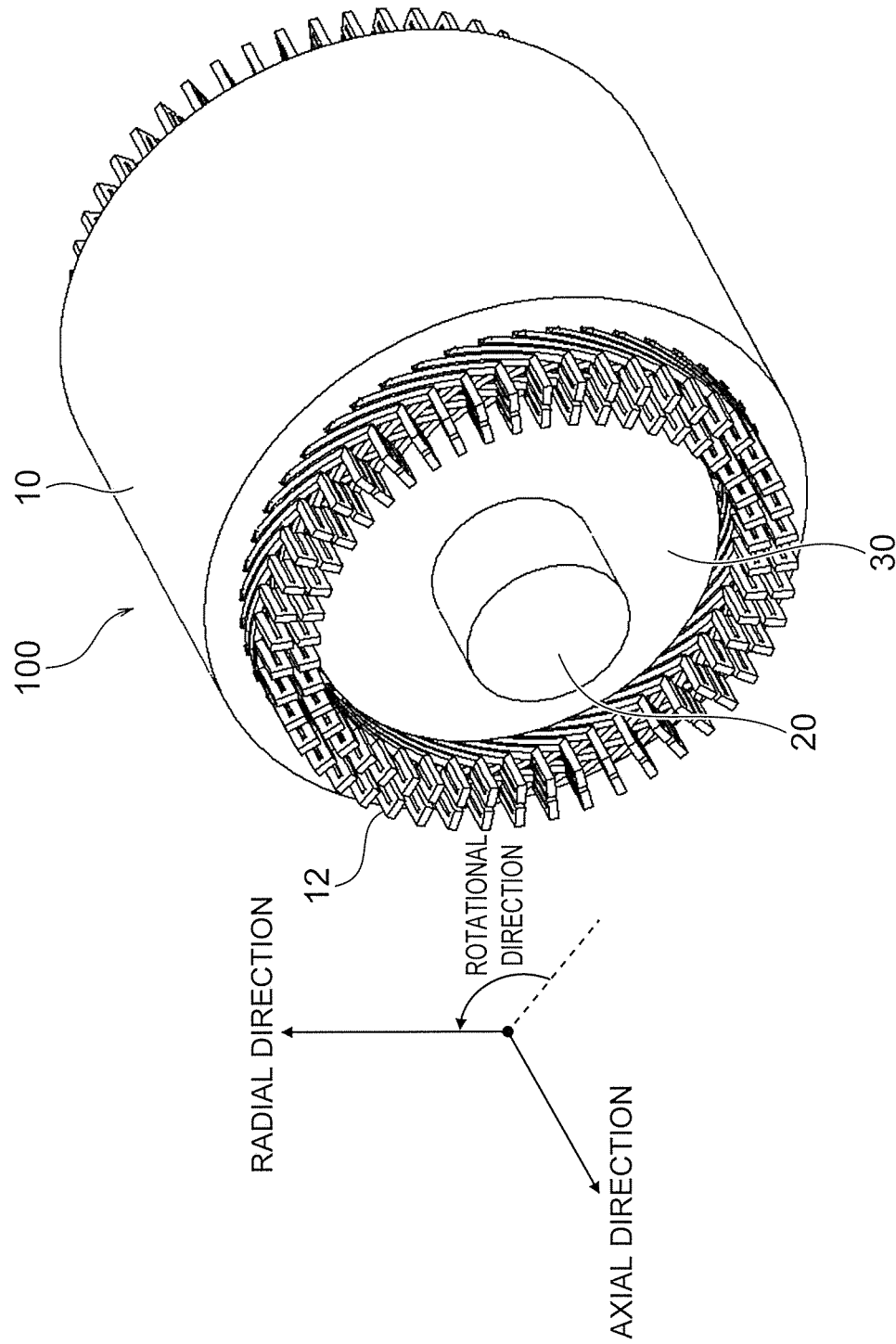
FIG. 1 is a perspective view for illustrating a configuration of a vehicle AC rotating machine according to a first embodiment of the present invention.
Figure 2:
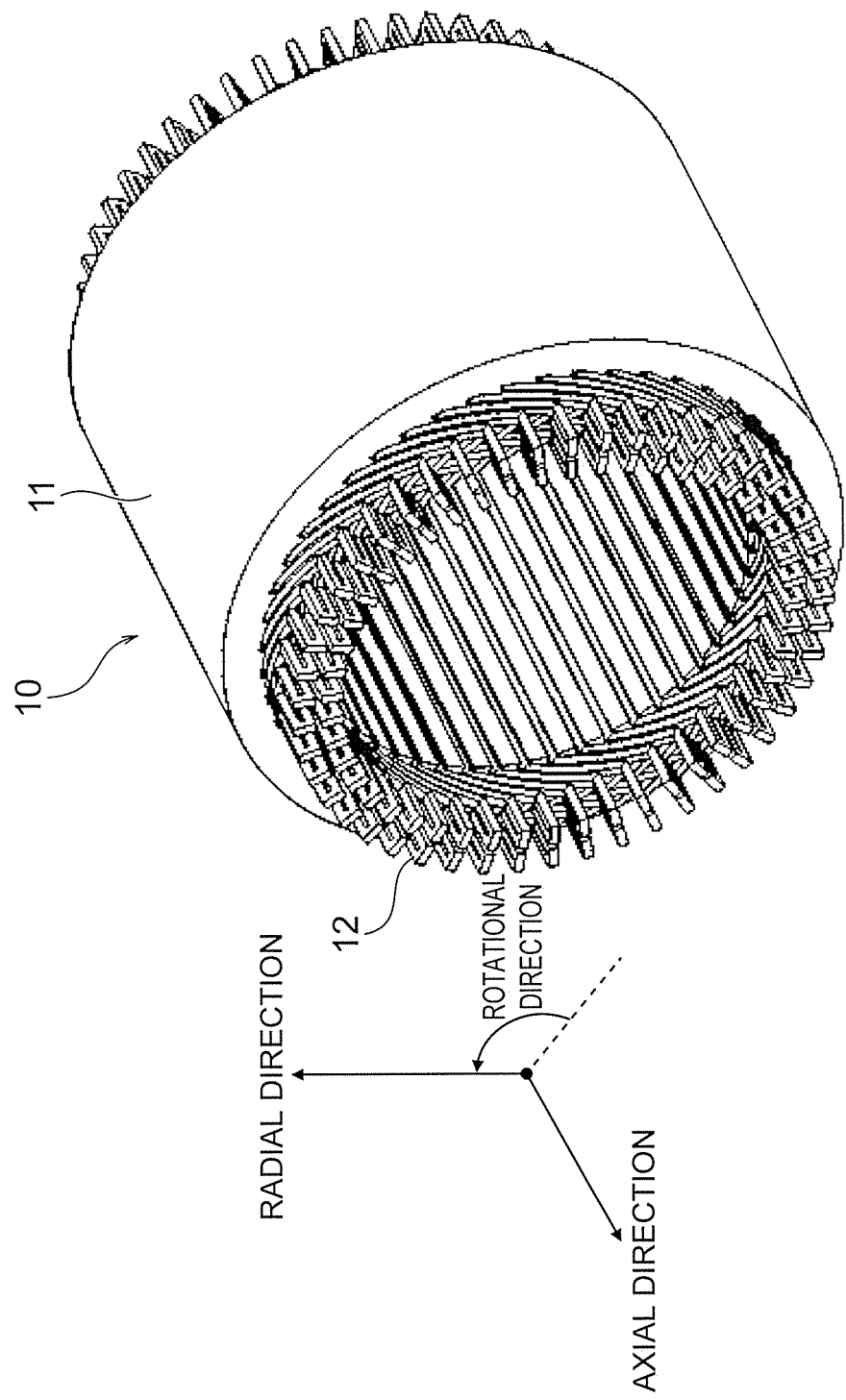
FIG. 2 is a perspective view for illustrating a configuration of a stator of the vehicle AC rotating machine according to the first embodiment of the present invention.
Figure 3:
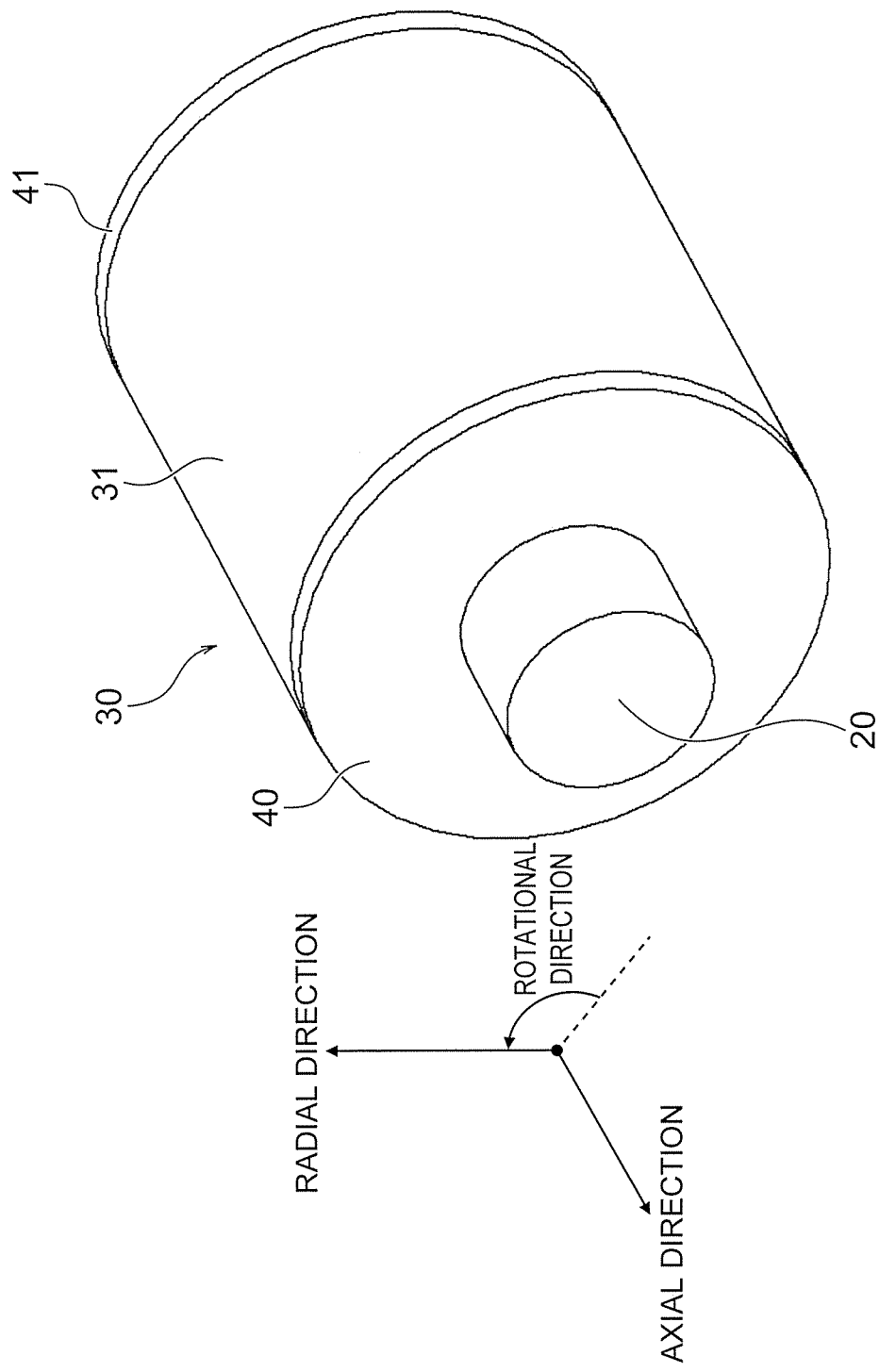
FIG. 3 is a perspective view for illustrating a configuration of a rotor of the vehicle AC rotating machine according to the first embodiment of the present invention.
Figure 4:
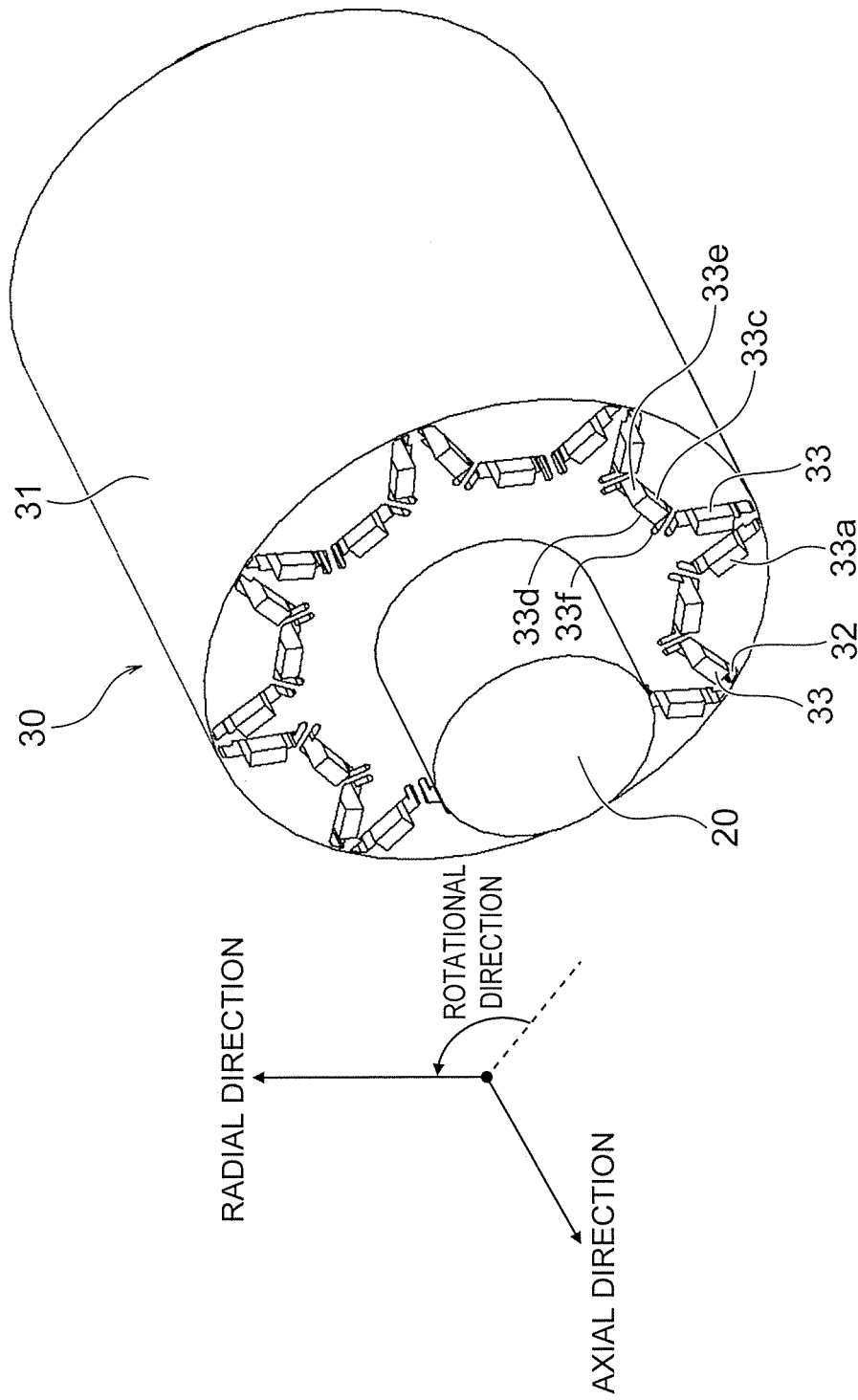
FIG. 4 is a perspective view for illustrating the configuration of the rotor of the vehicle AC rotating machine according to the first embodiment of the present invention from which a pair of axial end parts are removed.

A rotating electric machine according to a first embodiment of the present invention is described. In the first embodiment, a vehicle AC rotating machine 100 being an interior permanent magnet synchronous machine is exemplified as a rotating electric machine. FIG. 1 is a perspective view for illustrating a configuration of the vehicle AC rotating machine 100 according to the first embodiment. In FIG. 1, there are omitted illustrations of components such as a front bracket, a rear bracket, and a bearing that do not relate directly to the first embodiment. FIG. 2 is a perspective view for illustrating a configuration of a stator 10 of the vehicle AC rotating machine 100 according to the first embodiment. FIG. 3 is a perspective view for illustrating a configuration of a rotor 30 of the vehicle AC rotating machine 100 according to the first embodiment. FIG. 4 is a perspective view for illustrating the configuration of the rotor 30 of the vehicle AC rotating machine 100 according to the first embodiment from which a pair of axial end parts 40 and 41 are removed. In FIG. 1 to FIG. 4, a direction along an axial center of the rotor 30 is defined as an axial direction, and a direction along a radius of the rotor 30 is defined as a radial direction. Further, a rotating direction of the rotor 30 is defined as a rotational direction.

As illustrated in FIG. 1 to FIG. 4, the vehicle AC rotating machine 100 includes the stator 10 and the rotor 30. The rotor 30 is provided on an inner peripheral side of the stator 10 and is rotated about a shaft 20. The stator 10 is provided so as to surround an outer periphery of the rotor 30 with an air gap. The stator 10 is fixed to both of the front bracket and the rear bracket. The shaft 20 is supported on each of the front bracket and the rear bracket through intermediation of a bearing so as to be rotatable.

The stator 10 includes a cylindrical stator core 11 and a stator winding 12 coiled around the stator core 11. Along with rotation of the rotor 30, magnetic flux produced by rotor magnets 33 to be described later is interlinked with the stator winding 12.

The rotor 30 is an interior permanent magnet rotor including a cylindrical rotor core 31 and at least one rotor magnet 33 inserted into an insertion hole 32 formed so as to pass through the rotor core 31 in the axial direction. The rotor 30 illustrated in FIG. 4 includes twenty-four rotor magnets 33. The rotor core 31 is formed of a plurality of rotor core sheets laminated in the axial direction. The rotor magnets 33 each have a rectangular and flat-plate-like shape elongated in one direction. A longitudinal direction of each of the rotor magnets inserted into the insertion hole 32 is along the axial direction of the rotor 30. Both axial end portions of each rotor magnet 33 protrude respectively from both axial end portions of the rotor core 31 to an outer side in the axial direction. A pair of axial end surfaces 33a and 33b perpendicular to the axial direction are formed at the both axial end portions of each rotor magnet 33, respectively. In FIG. 4, only the axial end surface 33a on a front side of the drawing sheet is illustrated. Each rotor magnet 33 includes four side surfaces 33c, 33d, 33e, and 33f extending along the axial direction between the pair of axial end surfaces 33a and 33b.

The rotor 30 further includes the pair of axial end parts 40 and 41 configured to keep an axial position of each of the rotor magnets 33. The pair of axial end parts 40 and 41 are respectively provided on the both axial end portions of the rotor core 31 so as to sandwich the rotor core 31. The pair of axial end parts 40 and 41 are made of the same material as that for the rotor core 31, or a material different from that for the rotor core 31. Recessed portions 42 (see FIG. 6) in which the end portions of the rotor magnets 33 in the axial direction are to be respectively inserted are formed in each of the pair of axial end parts 40 and 41. Each of the rotor magnets 33 is fixed to each of the rotor core 31, the axial end part 40, and the axial end part 41 by a fixing member (not shown) made of a non-magnetic material. For example, an adhesive is used as the fixing member.

Figure 5:
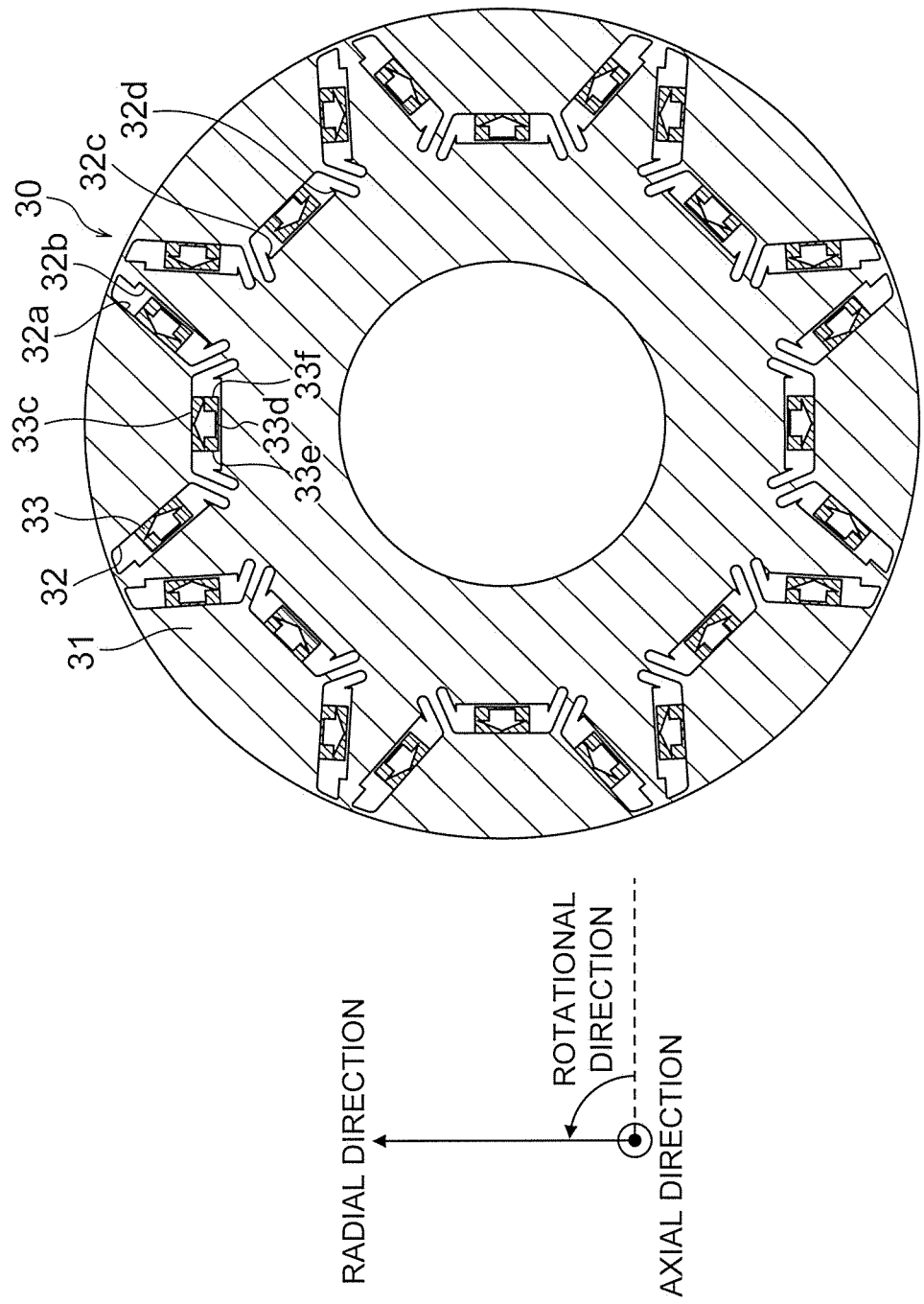
FIG. 5 is a sectional view for illustrating the configuration of the rotor of the vehicle AC rotating machine according to the first embodiment of the present invention taken along a direction perpendicular to an axial direction of the rotor.
Figure 6:
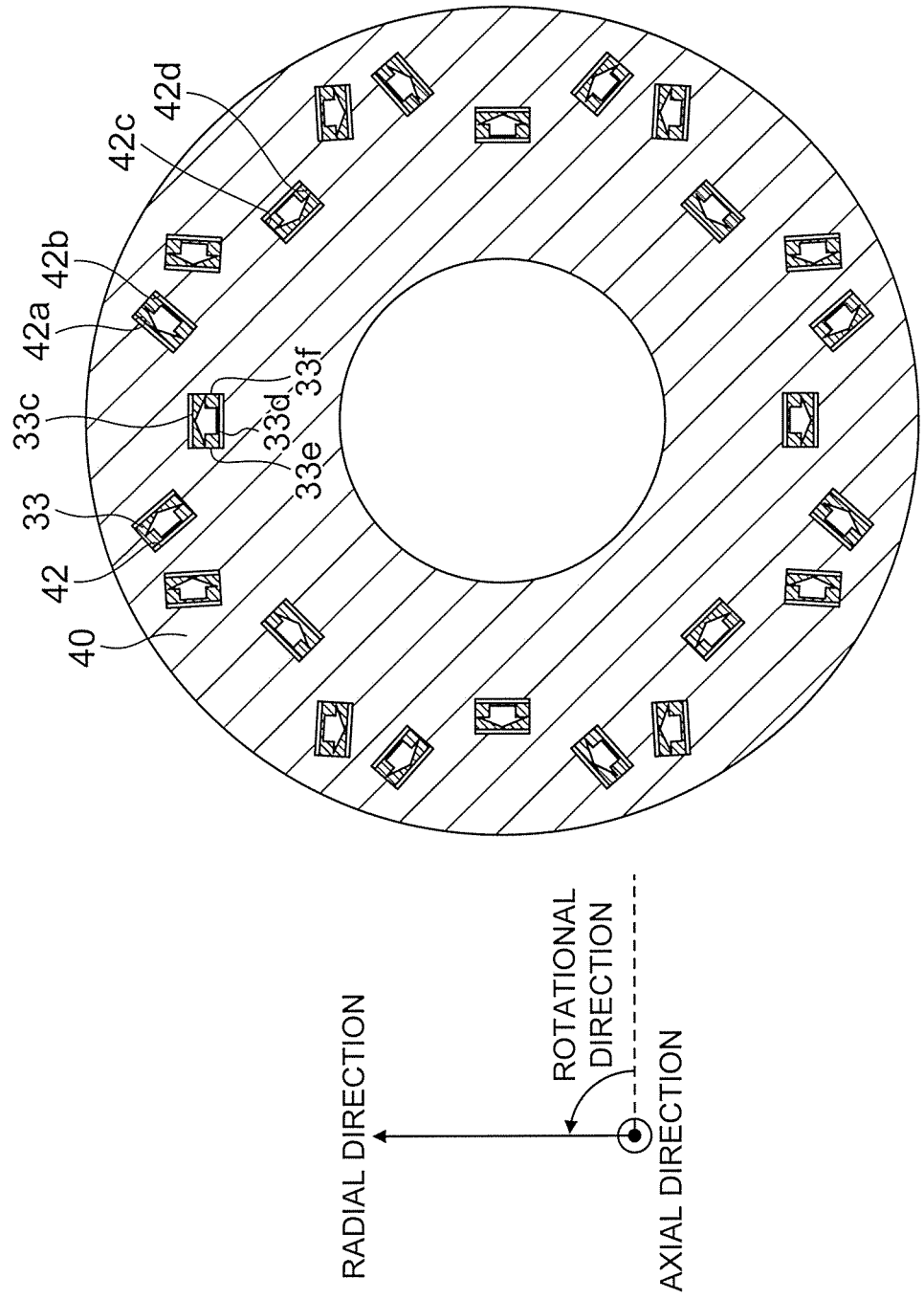
FIG. 6 is a sectional view for illustrating a configuration of the axial end part of the vehicle AC rotating machine according to the first embodiment of the present invention taken along the direction perpendicular to the axial direction.

FIG. 5 is a sectional view for illustrating the configuration of the rotor 30 of the vehicle AC rotating machine 100 according to the first embodiment taken along a direction perpendicular to the axial direction. In FIG. 5 and FIG. 6 to be described later, magnetization directions of the rotor magnets 33 are indicated by the thick arrows, respectively. As illustrated in FIG. 5, the rotor magnets 33 each have a rectangular sectional shape. The side surface 33c and the side surface 33d are surfaces that form long sides of a cross section of the rotor magnet 33 taken along the direction perpendicular to the axial direction. The side surface 33c and the side surface 33d are parallel to each other, and are perpendicular to the magnetization direction of the rotor magnet 33. The side surface 33e and the side surface 33f are surfaces that form short sides of the cross section of the rotor magnet 33 taken along the direction perpendicular to the axial direction. The side surface 33e and the side surface 33f are parallel to each other, and are parallel to the magnetization direction of the rotor magnet 33. When seen along the axial direction of the rotor magnet 33, the side surface 33e is perpendicular to the side surface 33c and the side surface 33d. That is, the side surface 33e is parallel to neither the side surface 33c nor the side surface 33d. Further, when seen along the axial direction of the rotor magnet 33, the side surface 33f is perpendicular to the side surface 33c and the side surface 33d. That is, the side surface 33f is parallel to neither the side surface 33c nor the side surface 33d.

The side surface 33c is, of the two side surfaces 33c and 33d perpendicular to the magnetization direction of the rotor magnet 33, a side surface located on the outer side in the radial direction of the rotor 30. The side surface 33c is fixed to an inner wall surface 32a of the insertion hole 32 opposed to the side surface 33c. The side surface 33c and the inner wall surface 32a are joined to each other through intermediation of an adhesive layer (not shown). In the cross section illustrated in FIG. 5, a width of the inner wall surface 32a along the side surface 33c is larger than a width of the side surface 33c.

The side surface 33d is, of the two side surfaces 33c and 33d perpendicular to the magnetization direction of the rotor magnet 33, a side surface located on the inner side in the radial direction of the rotor 30. The side surface 33d is arranged so as to be opposed to an inner wall surface 32b of the insertion hole 32 with an interspace between the side surface 33d and the inner wall surface 32b. A space may be defined between the side surface 33d and the inner wall surface 32b, or the space may be filled with a filling material such as a resin. Further, the side surface 33d may be fixed to the inner wall surface 32b. In the cross section illustrated in FIG. 5, a width of the inner wall surface 32b along the side surface 33d is larger than a width of the side surface 33d.

The side surface 33e is arranged so as to be opposed to an inner wall surface 32c of the insertion hole 32 with an interspace between the side surface 33e and the inner wall surface 32c. A space may be defined between the side surface 33e and the inner wall surface 32c, or the space may be filled with a filling material such as a resin.

The side surface 33f is arranged so as to be opposed to an inner wall surface 32d of the insertion hole 32 with an interspace between the side surface 33f and the inner wall surface 32d. A space may be defined between the side surface 33f and the inner wall surface 32d, or the space may be filled with a filling material such as a resin. One of a set of the side surface 33e and the inner wall surface 32c, or a set of the side surface 33f and the inner wall surface 32d may be joined together through intermediation of an adhesive layer.

FIG. 6 is a sectional view for illustrating a configuration of the axial end part 40 of the vehicle AC rotating machine 100 according to the first embodiment taken along the direction perpendicular to the axial direction. A sectional configuration of the axial end part 41 in the first embodiment is the same as the sectional configuration of the axial end part 40. As illustrated in FIG. 6, the side surface 33c of each of the rotor magnets 33 is arranged so as to be opposed to an inner wall surface 42a of each of the recessed portions 42 with an interspace between the side surface 33c and the inner wall surface 42a. A space may be defined between the side surface 33c and the inner wall surface 42a, or the space may be filled with a filling material such as a resin.

The side surface 33d is arranged so as to be opposed to an inner wall surface 42b of each of the recessed portions 42 with an interspace between the side surface 33d and the inner wall surface 42b. A space may be defined between the side surface 33d and the inner wall surface 42b, or the space may be filled with a filling material such as a resin.

The side surface 33e is fixed to an inner wall surface 42c of the recessed portion 42 opposed to the side surface 33e. The side surface 33e and the inner wall surface 42c are joined to each other through intermediation of an adhesive layer (not shown). In the cross section illustrated in FIG. 6, a width of the inner wall surface 42c along the side surface 33e is larger than a width of the side surface 33e.

The side surface 33f is fixed to an inner wall surface 42d of the recessed portion 42 opposed to the side surface 33f. The side surface 33f and the inner wall surface 42d are joined to each other through intermediation of an adhesive layer (not shown). In the cross section illustrated in FIG. 6, a width of the inner wall surface 42d along the side surface 33f is larger than a width of the side surface 33f. In the first embodiment, both of the side surface 33e and the side surface 33f are fixed to the inner wall surfaces of the recessed portion 42, respectively. However, the side surface 33e or the side surface 33f may be arranged with an interspace between the inner wall surface of the recessed portion 42 and the side surface.

Here, with reference to FIG. 5 and FIG. 6, comparison is made between a dimension of the insertion hole 32 in the cross section perpendicular to the axial direction, and a dimension of the recessed portion 42 in the cross section perpendicular to the axial direction. The width of the inner wall surface 32a of the insertion hole 32 along the side surface 33c is larger than a width of the inner wall surface 42a of the recessed portion 42 in the same direction. The width of the inner wall surface 32b of the insertion hole 32 along the side surface 33d is larger than a width of the inner wall surface 42b of the recessed portion 42 in the same direction. A width of the inner wall surface 32c of the insertion hole 32 along the side surface 33e, that is, a distance between the inner wall surface 32a and the inner wall surface 32b is smaller than a width of the inner wall surface 42c of the recessed portion 42 in the same direction. A width of the inner wall surface 32d of the insertion hole 32 along the side surface 33f, that is, a distance between the inner wall surface 32a and the inner wall surface 32b is smaller than a width of the inner wall surface 42d of the recessed portion 42 in the same direction.

Each of the rotor magnets 33 is fixed to the rotor core 31 through surface joining between the side surface 33c and the inner wall surface 32a. Further, each of the rotor magnets 33 is fixed to the axial end part 40 through surface joining between the side surface 33e and the inner wall surface 42c, and through surface joining between the side surface 33f and the inner wall surface 42d. With this configuration, each of the rotor magnets 33 is prevented from being held through point contact with a holding part, and hence each of the rotor magnets 33 is stably held. Stress that is generated in each of the rotor magnets 33 under a state in which the rotor magnet 33 is fixed is dispersed in accordance with a size of a surface to which the rotor magnet 33 is fixed. Thus, according to the first embodiment, reduction in strength of the rotor magnets 33 can be suppressed.

Further, in the first embodiment, the rotor magnets 33 can be fixed to the rotor core 31 and the axial end part 40 without use of an elastic member. Therefore, according to the first embodiment, the stress generated in the rotor magnets 33 can be reduced, thereby being capable of suppressing reduction in strength of the rotor magnets 33.

Figure 7:
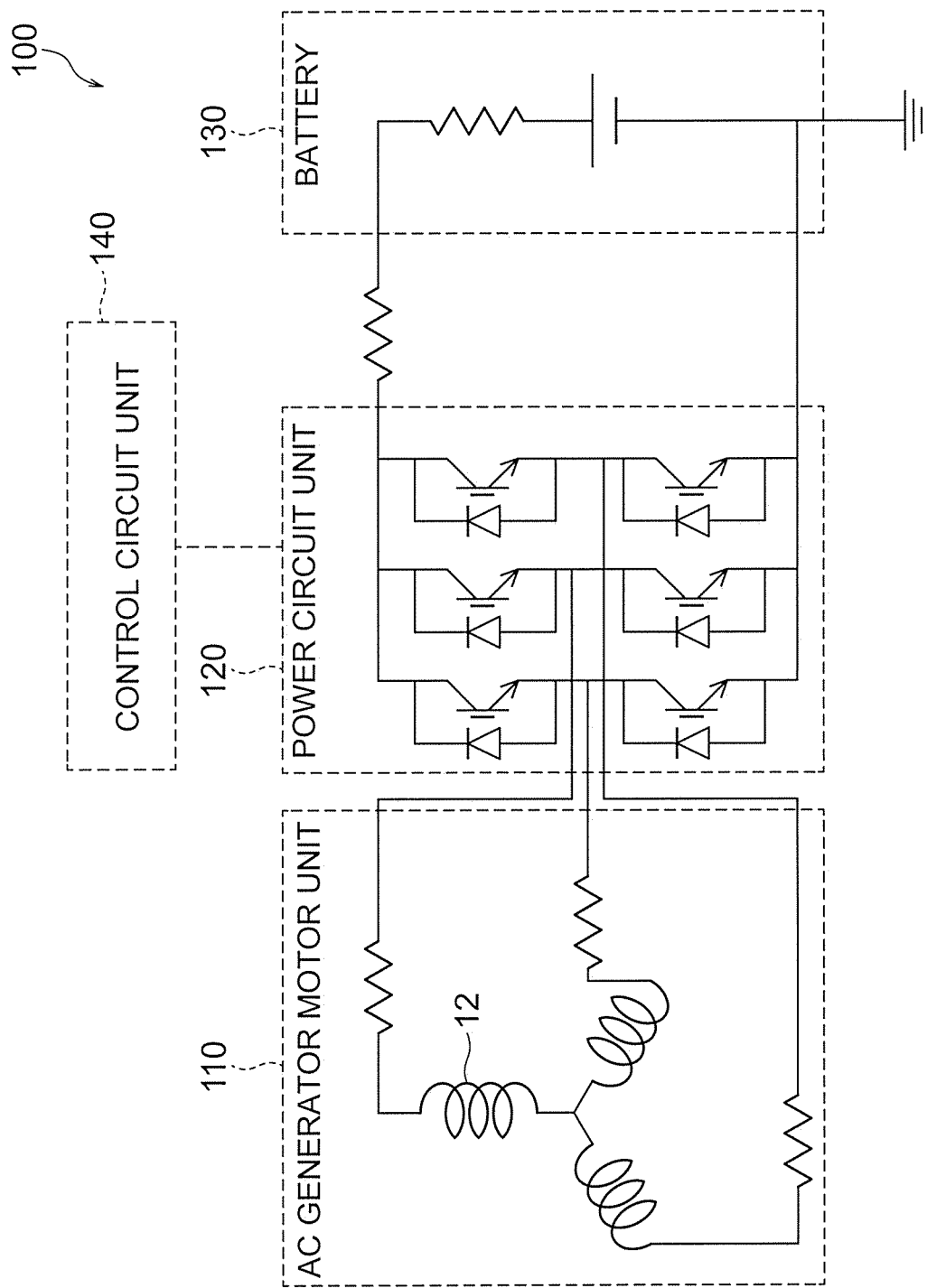
FIG. 7 is a view for illustrating a circuit configuration of the vehicle AC rotating machine according to the first embodiment of the present invention.

FIG. 7 is a view for illustrating a circuit configuration of the vehicle AC rotating machine 100 according to the first embodiment. The vehicle AC rotating machine 100 is mounted in a hybrid vehicle including an engine. As illustrated in FIG. 7, the vehicle AC rotating machine 100 includes an AC generator motor unit 110, a power circuit unit 120, a battery 130, and a control circuit unit 140. The AC generator motor unit 110 includes the stator 10 and the rotor 30. The power circuit unit 120 is configured to supply AC power to the AC generator motor unit 110. The battery 130 is configured to supply DC power to the power circuit unit 120. The control circuit unit 140 is configured to control the power circuit unit 120.

Operation of the vehicle AC rotating machine 100 as a motor is described. The DC power is supplied from the battery 130 to the power circuit unit 120 through a power supply terminal. The control circuit unit 140 performs on/off control on switching elements of the power circuit unit 120. In this manner, the DC power supplied to the power circuit unit 120 is converted into the AC power. The converted AC power is supplied to the stator winding 12 of the AC generator motor unit 110. The magnetic flux produced by the rotor magnets 33 is interlinked with the stator winding 12 through which an AC current flows. Thus, driving torque is generated, thereby rotating and driving the rotor 30.

Operation of the vehicle AC rotating machine 100 as a generator is described. Under a state in which the engine is operated, rotational torque of the engine is transmitted from a crankshaft to the shaft 20 through mechanical connection parts such as a belt and a gear, thereby rotating the rotor 30. At this time, the magnetic flux produced by the rotor magnets 33 is interlinked with the stator winding 12 so that a three-phase AC voltage is induced in the stator winding 12. When the control circuit unit 140 performs on/off control on the switching elements of the power circuit unit 120, three-phase AC power induced in the stator winding 12 is converted into the DC power, and thus the battery 130 is charged.

Figure 8:
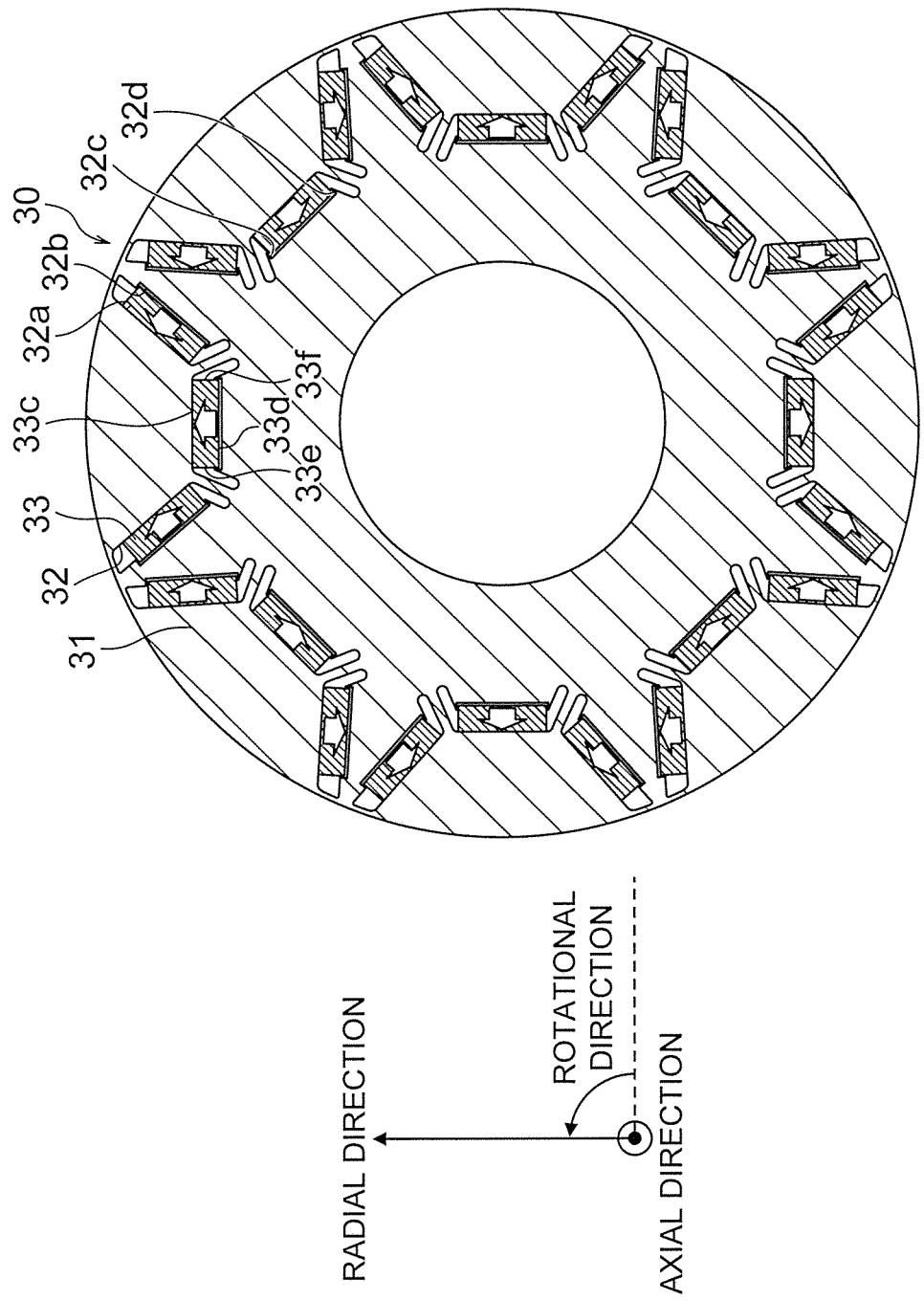
FIG. 8 is a sectional view for illustrating the configuration of the rotor of the vehicle AC rotating machine according to the first embodiment of the present invention when a dimension of each rotor magnet is changed.
Figure 9:
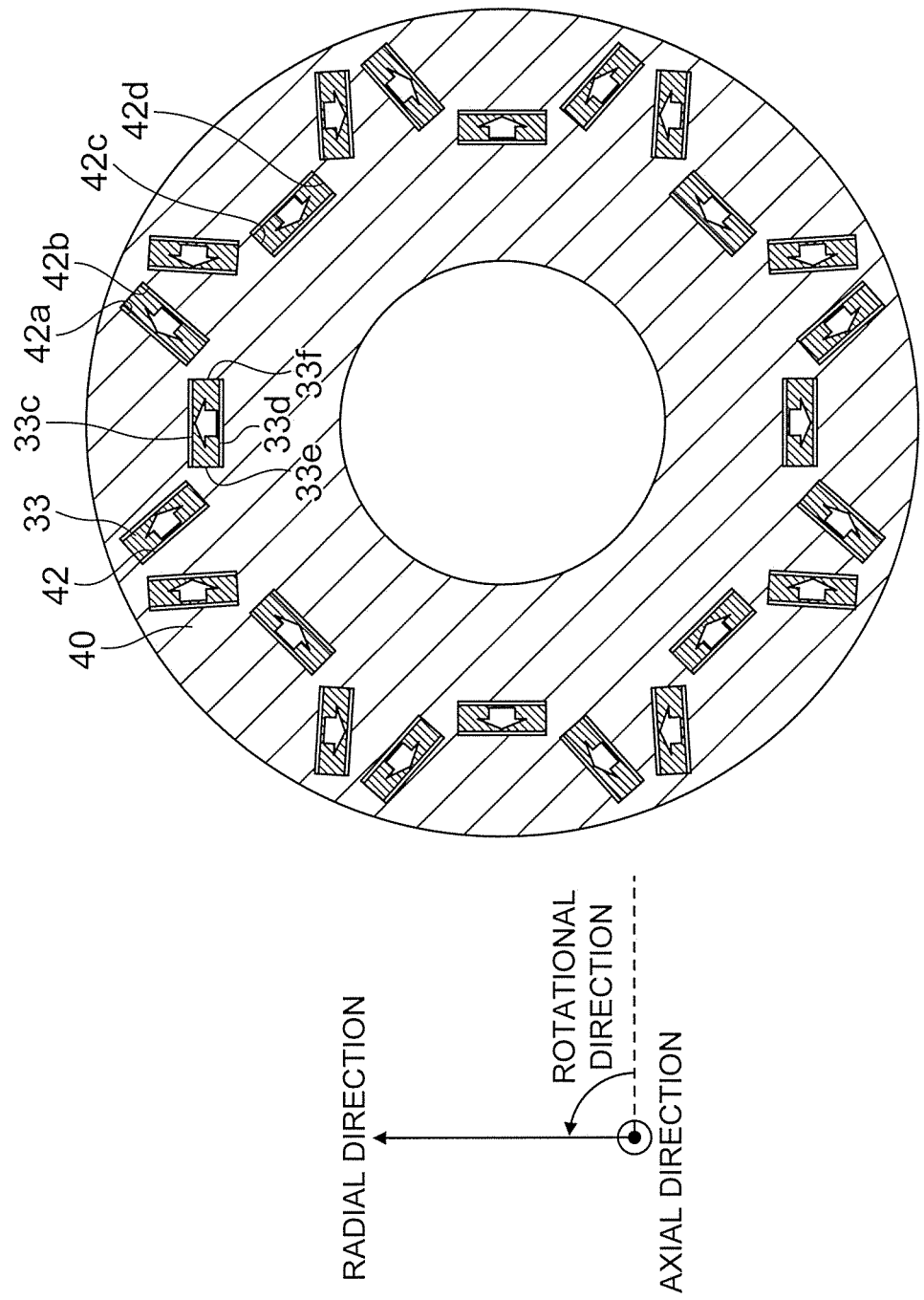
FIG. 9 is a sectional view for illustrating the configuration of the axial end part of the vehicle AC rotating machine according to the first embodiment of the present invention when the dimension of each rotor magnet is changed.

Next, description is made of a case in which the dimension of each rotor magnet 33 is changed to increase an area of the side surface 33c to be fixed to the rotor core 31 as compared to each rotor magnet 33 illustrated in FIG. 5 and FIG. 6. FIG. 8 is a sectional view for illustrating the configuration of the rotor 30 of the vehicle AC rotating machine 100 according to the first embodiment when the dimension of each rotor magnet 33 is changed. FIG. 9 is a sectional view for illustrating the configuration of the axial end part 40 of the vehicle AC rotating machine 100 according to the first embodiment when the dimension of each rotor magnet 33 is changed. As compared to each rotor magnet 33 illustrated in FIG. 5 and FIG. 6, the dimension of each rotor magnet 33 illustrated in FIG. 8 and FIG. 9 is changed to increase the width of the side surface 33c.

In the axial end part 40 illustrated in FIG. 6, the width of the inner wall surface 42a along the side surface 33c is substantially equal to the width of the side surface 33c. Accordingly, when the dimension of each rotor magnet 33 is changed to increase the width of the side surface 33c, as illustrated in FIG. 9, it is required to increase the width of the inner wall surface 42a in accordance with the width of the side surface 33c. Therefore, it is required to change a manufacturing mold for the axial end part 40 in order to hold the rotor magnets 33.

Meanwhile, in the rotor core 31 illustrated in FIG. 5, the width of the inner wall surface 32a along the side surface 33c is larger than the width of the side surface 33c. With this configuration, even when the dimension of each rotor magnet 33 is changed to increase the width of the side surface 33c, it is not required to change a shape of the rotor core 31. Accordingly, the rotor cores 31 having the same shape can be used, and hence the common manufacturing mold can be used for the rotor cores 31. That is, when the dimension of each rotor magnet 33 is changed to increase the area of the side surface 33c to be fixed to the rotor core 31, it is required to change the manufacturing mold for the axial end part 40, but the manufacturing mold for the rotor core 31 can be standardized.

Figure 10:
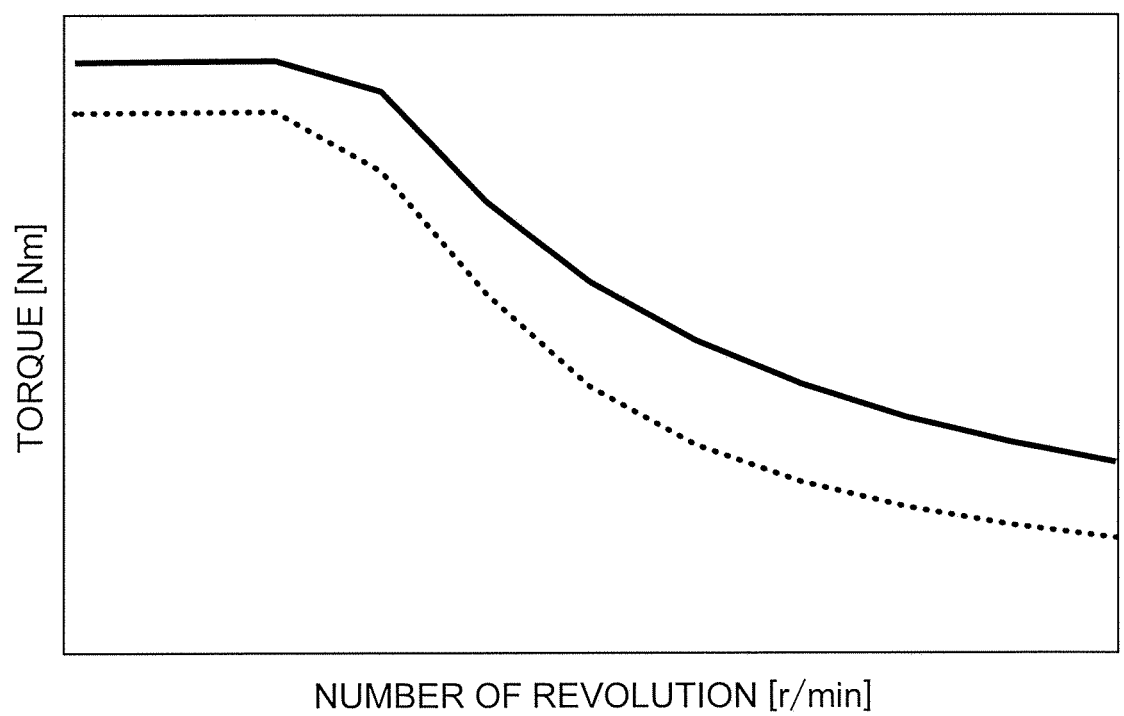
FIG. 10 is a graph for showing variations in output characteristics when an area of a side surface perpendicular to a magnetization direction of the rotor magnet is changed in the vehicle AC rotating machine according to the first embodiment of the present invention.

In the first embodiment, the side surface 33c is a side surface perpendicular to the magnetization direction of the rotor magnet 33. FIG. 10 is a graph for showing variations in output characteristics when the area of the side surface 33c perpendicular to the magnetization direction of the rotor magnet 33 is changed in the vehicle AC rotating machine 100 according to the first embodiment. The horizontal axis represents the number of revolution [r/min], and the vertical axis represents torque [Nm]. The broken line in the graph indicates output characteristics when the area of the side surface 33c is relatively small. The solid line in the graph indicates output characteristics when the area of the side surface 33c is relatively large. As shown in FIG. 10, it is understood that, when the dimension of each rotor magnet 33 is changed to increase the area of the side surface 33c, the torque is increased in the entire revolution number range. Therefore, according to the first embodiment, through an increase in area of the side surface 33c, the torque of the rotating electric machine can be increased without changing the manufacturing mold for the rotor core 31.

Although not shown, when the dimension of each rotor magnet 33 is changed to increase the areas of the side surface 33e and the side surface 33f to be fixed to the axial end part 40, at least a shape of the axial end part 40 can be standardized. Thus, the manufacturing mold for the axial end part 40 can be standardized. Further, when the dimension of each rotor magnet 33 is changed to reduce the area of the side surface 33c, both of the shape of the rotor core 31 and the shape of the axial end part 40 can be standardized. Thus, the manufacturing mold for the rotor core 31 and the manufacturing mold for the axial end part 40 can be standardized. Even when the dimension of each rotor magnet 33 is changed to reduce the areas of the side surface 33e and the side surface 33f, both of the shape of the rotor core 31 and the shape of the axial end part 40 can be standardized. Thus, the manufacturing mold for the rotor core 31 and the manufacturing mold for the axial end part 40 can be standardized.

As described above, in the first embodiment, even when the dimension of each rotor magnet 33 is changed, at least one of the manufacturing mold for the rotor core 31 or the manufacturing mold for the axial end part 40 can be standardized. Therefore, according to the first embodiment, an increase in manufacturing cost accompanied with the change in dimension of each rotor magnet 33 can be suppressed.

Further, in the first embodiment, each of the plurality of rotor magnets 33 is magnetized so as to produce the magnetic flux passing from a radially inner side to a radially outer side thereof. Thus, the magnetic flux produced by the rotor magnets 33 is easily interlinked with the stator 10 provided on an outer peripheral side of the rotor 30, thereby being capable of reducing the number of the rotor magnets 33 required to obtain desired output of the rotating machine.

As described above, the vehicle AC rotating machine 100 according to the first embodiment includes the stator 10, and the rotor 30 provided so as to be rotatable relative to the stator 10. The rotor 30 includes the rotor core 31, the axial end part 40, and the rotor magnets 33. The axial end part 40 is provided at an end portion of the rotor core 31 in the axial direction of the rotor 30. The rotor magnets 33 are respectively inserted into the insertion holes 32 formed so as to pass through the rotor core 31 in the axial direction, and are fixed to both of the rotor core 31 and the axial end part 40. The axial end part 40 has the recessed portions 42 in which the end portions of the rotor magnets 33 in the axial direction are to be inserted, respectively. Each of the rotor magnets 33 includes, as side surfaces along the axial direction, the side surface 33*c* and the side surface 33*e* different from the side surface 33*c*. The side surface 33*c* is fixed to the inner wall surface 32*a* of the insertion hole 32 opposed to the side surface 33*c*. In the cross section perpendicular to the axial direction, the width of the inner wall surface 32*a* along the side surface 33*c* is larger than the width of the side surface 33*c*. The side surface 33*e* is fixed to the inner wall surface 42*c* of the recessed portion 42 opposed to the side surface 33*e*. In the cross section perpendicular to the axial direction, the width of the inner wall surface 42*c* along the side surface 33*e* is larger than the width of the side surface 33*e*. Here, the vehicle AC rotating machine 100 is an example of the rotating electric machine. The side surface 33*c* is an example of a first side surface. The side surface 33*e* is an example of a second side surface. The inner wall surface 32*a* is an example of a first inner wall surface. The inner wall surface 42*c* is an example of a second inner wall surface.

With this configuration, even when the dimension of each rotor magnet 33 is changed, at least one of the shape of the rotor core 31 or the shape of the axial end part 40 can be standardized. Thus, at least one of the manufacturing mold for the rotor core 31 or the manufacturing mold for the axial end part 40 can be standardized. Accordingly, an increase in manufacturing cost accompanied with the change in dimension of each rotor magnet 33 can be suppressed. Further, with this configuration, the rotor magnets 33 are fixed to both of the rotor core 31 and the axial end part 40 through surface joining, thereby being capable of stably holding the rotor magnets 33. Therefore, according to the first embodiment, while an increase in manufacturing cost accompanied with the change in dimension of each rotor magnet 33 is suppressed, the rotor magnets 33 can be stably held.

Further, in the vehicle AC rotating machine 100 according to the first embodiment, the side surface 33*c* is, of the two side surfaces 33*c* and 33*d* perpendicular to the magnetization direction of the rotor magnet 33, the side surface located on the outer side in the radial direction of the rotor 30. The side surface 33*e* is the side surface parallel to the magnetization direction of the rotor magnet 33. With this configuration, even when the dimension of each rotor magnet 33 is changed to increase the area of the side surface 33*c* serving as a magnetic-flux output surface of the rotor magnet 33, the shape of the rotor core 31 can be standardized, and hence the manufacturing mold for the rotor core 31 can be standardized. Therefore, the common manufacturing mold for the rotor cores 31 can be used among rotating electric machines different from each other in output.

Figure 11:
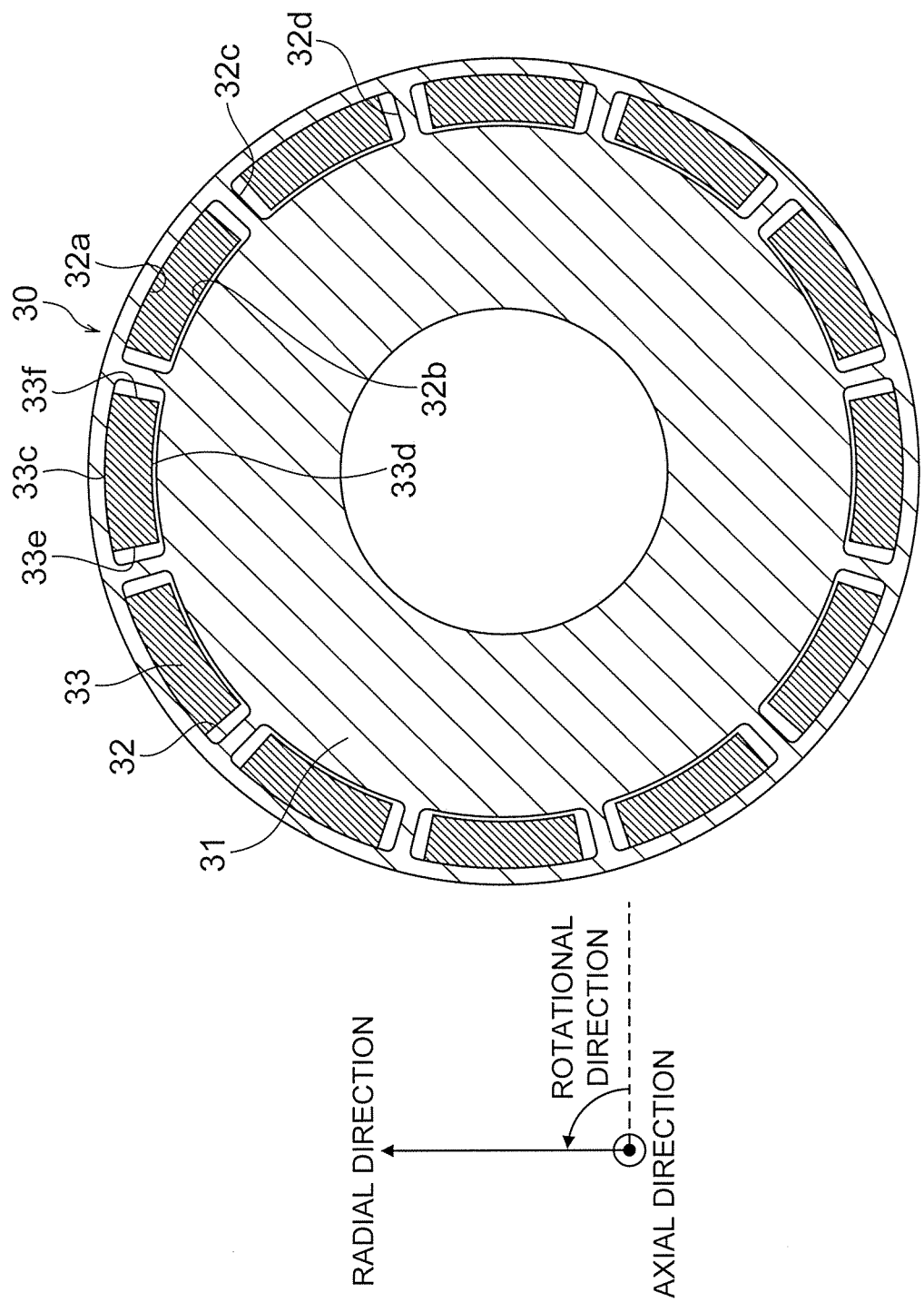
FIG. 11 is a sectional view for illustrating a configuration of the rotor of the vehicle AC rotating machine according to a modification example of the first embodiment of the present invention taken along the direction perpendicular to the axial direction.

In the first embodiment, the configuration using the rotor magnets 33 each having a rectangular sectional shape is described by way of example, but the sectional shape of each of the rotor magnets 33 is not limited to a rectangular shape. FIG. 11 is a sectional view for illustrating a configuration of the rotor 30 of the vehicle AC rotating machine 100 according to a modification example of the first embodiment taken along the direction perpendicular to the axial direction. As illustrated in FIG. 11, the plurality of rotor magnets 33 in the modification example each have a circular arc sectional shape. Each of the rotor magnets 33 includes, as side surfaces along the axial direction, the side surface 33*c* and the side surface 33*d* each having a partial cylindrical shape, and the side surface 33*e* and the side surface 33*f* each having a flat shape. The side surface 33*c* and the side surface 33*d* are surfaces that form long sides of a cross section of the rotor magnet 33 taken along the direction perpendicular to the axial direction. In the cross section, both of the side surface 33*c* and the side surface 33*d* extend along the rotational direction of the rotor 30. The side surface 33*e* and the side surface 33*f* are surfaces that form short sides of the cross section of the rotor magnet 33 taken along the direction perpendicular to the axial direction. In the cross section, both of the side surface 33*e* and the side surface 33*f* extend along the radial direction of the rotor 30.

The side surface 33*c* is, of the two side surfaces 33*c* and 33*d* substantially perpendicular to the magnetization direction of the rotor magnet 33, the side surface located on the outer side in the radial direction of the rotor 30. The side surface 33*c* is fixed to the inner wall surface 32*a* of the insertion hole 32 opposed to the side surface 33*c*. The inner wall surface 32*a* is formed into a partial cylindrical shape along the side surface 33*c*. The side surface 33*c* and the inner wall surface 32*a* are joined to each other through intermediation of an adhesive layer (not shown). In the cross section illustrated in FIG. 11, the width of the inner wall surface 32*a* along the side surface 33*c* is larger than the width of the side surface 33*c*.

The side surface 33*d* is arranged so as to be opposed to the inner wall surface 32*b* of the insertion hole 32 with an interspace between the side surface 33*d* and the inner wall surface 32*b*. The inner wall surface 32*b* is formed into a partial cylindrical shape along the side surface 33*d*. A space may be defined between the side surface 33*d* and the inner wall surface 32*b*, or the space may be filled with a filling material such as a resin. The side surface 33*d* may be fixed to the inner wall surface 32*b*. In the cross section illustrated in FIG. 11, the width of the inner wall surface 32*b* along the side surface 33*d* is larger than the width of the side surface 33*d*.

The side surface 33*e* is arranged so as to be opposed to the inner wall surface 32*c* of the insertion hole 32 with an interspace between the side surface 33*e* and the inner wall surface 32*c*. A space may be defined between the side surface 33*e* and the inner wall surface 32*c*, or the space may be filled with a filling material such as a resin.

The side surface 33*f* is arranged so as to be opposed to the inner wall surface 32*d* of the insertion hole 32 with an interspace between the side surface 33*f* and the inner wall surface 32*d*. A space may be defined between the side surface 33f and the inner wall surface 32d, or the space may be filled with a filling material such as a resin.

Figure 12:
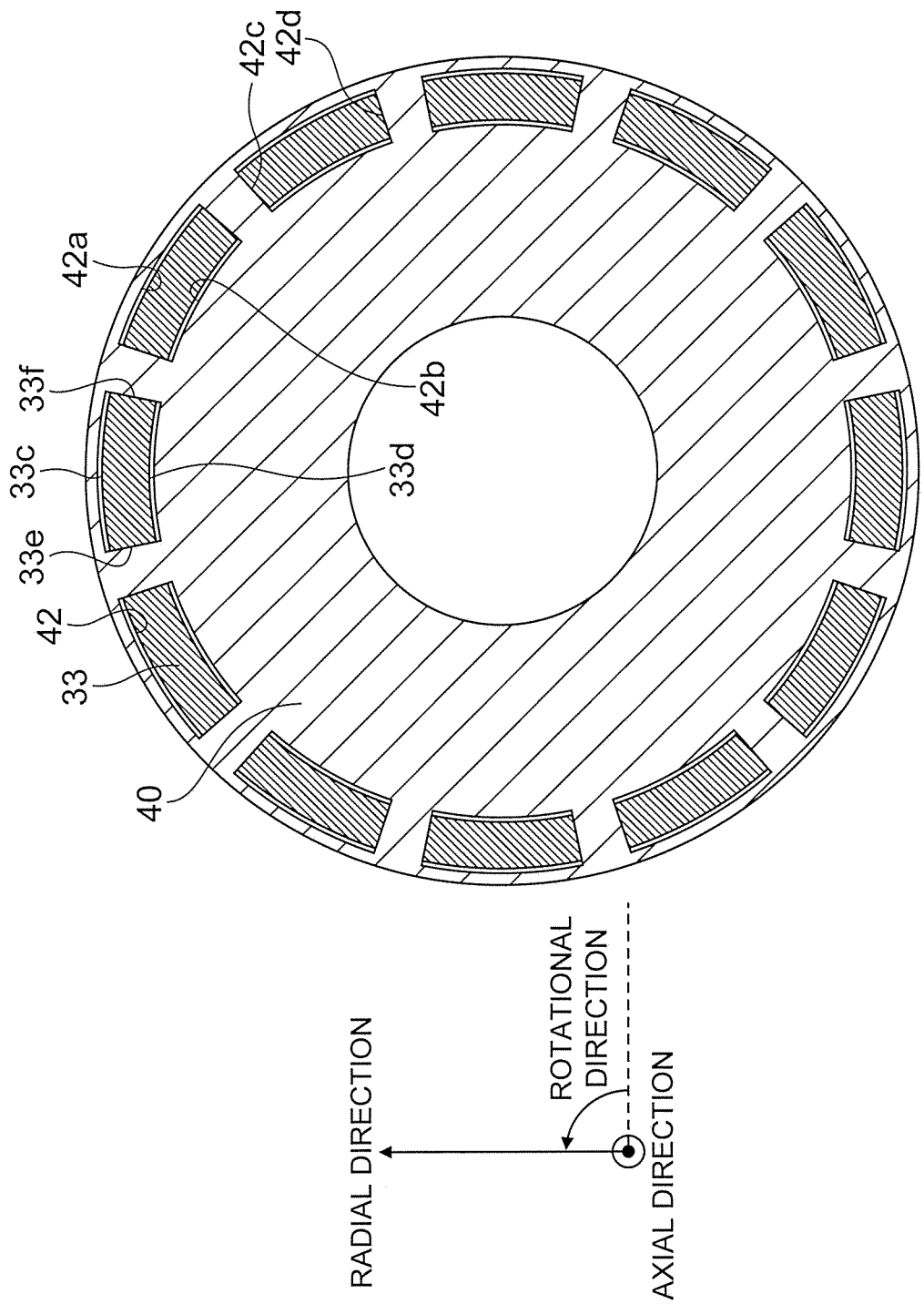
FIG. 12 is a sectional view for illustrating a configuration of the axial end part of the vehicle AC rotating machine according to the modification example of the first embodiment of the present invention taken along the direction perpendicular to the axial direction.

FIG. 12 is a sectional view for illustrating a configuration of the axial end part 40 of the vehicle AC rotating machine 100 according to the modification example of the first embodiment taken along the direction perpendicular to the axial direction. As illustrated in FIG. 12, the side surface 33c of each of the rotor magnets 33 is arranged so as to be opposed to the inner wall surface 42a of each of the recessed portions 42 with an interspace between the side surface 33c and the inner wall surface 42a. A space may be defined between the side surface 33c and the inner wall surface 42a, or the space may be filled with a filling material such as resin.

The side surface 33d is arranged so as to be opposed to the inner wall surface 42b of each of the recessed portions 42 with an interspace between the side surface 33d and the inner wall surface 42b. A space may be defined between the side surface 33d and the inner wall surface 42b, or the space may be filled with a filling material such as a resin.

The side surface 33e is fixed to the inner wall surface 42c of the recessed portion 42 opposed to the side surface 33e. The side surface 33e and the inner wall surface 42c are joined to each other through intermediation of an adhesive layer (not shown). In the cross section illustrated in FIG. 12, the width of the inner wall surface 42c along the side surface 33e is larger than the width of the side surface 33e.

The side surface 33f is fixed to the inner wall surface 42d of the recessed portion 42 opposed to the side surface 33f. The side surface 33f and the inner wall surface 42d are joined to each other through intermediation of an adhesive layer (not shown). In the cross section illustrated in FIG. 12, the width of the inner wall surface 42d along the side surface 33f is larger than the width of the side surface 33f.

With the configuration in the modification example, the same effects as those obtained with the configuration illustrated in FIG. 1 to FIG. 6 can be obtained.

Second Embodiment

Figure 13:
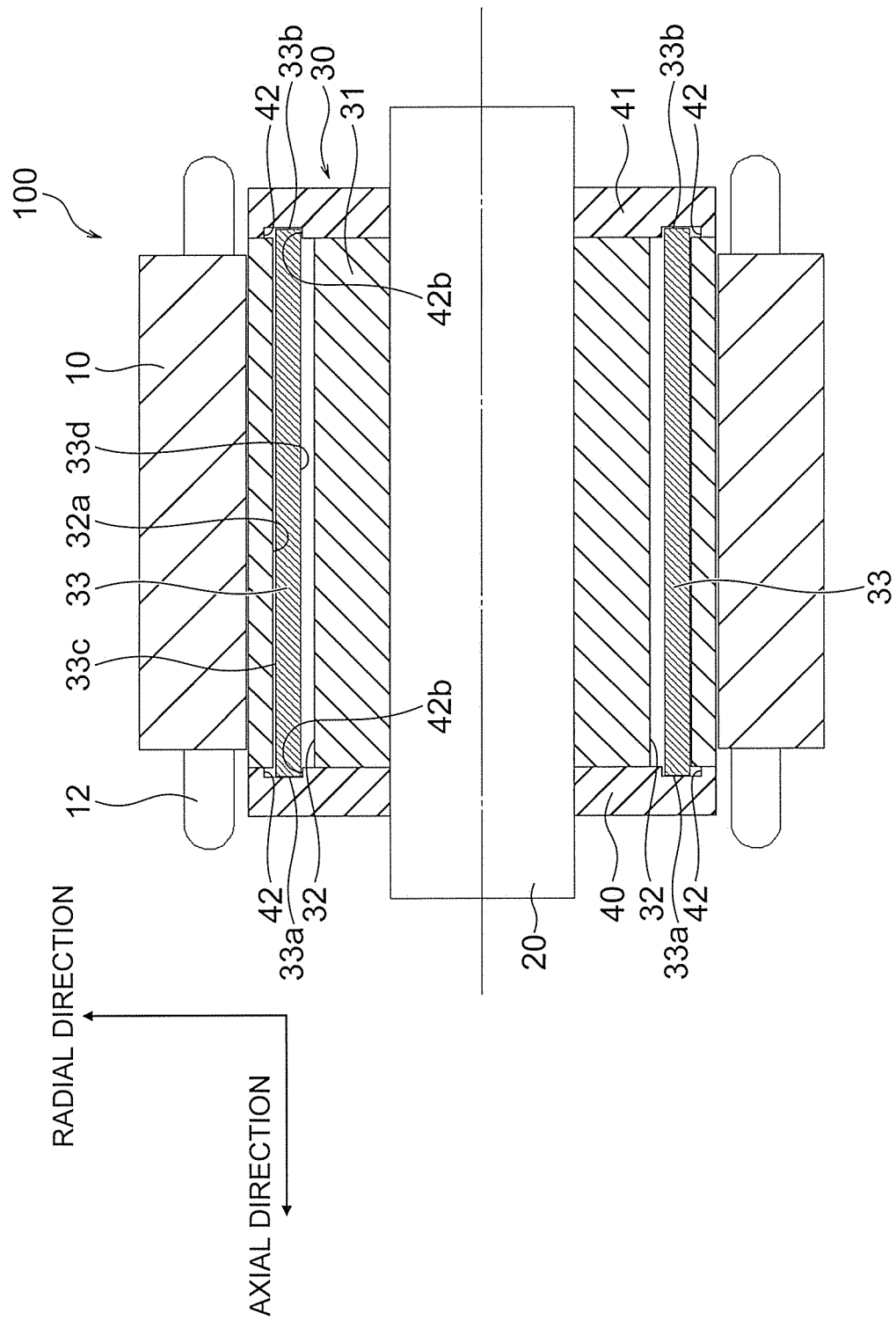
FIG. 13 is a sectional view for illustrating a configuration of the vehicle AC rotating machine according to a second embodiment of the present invention taken along the axial direction.

A rotating electric machine according to a second embodiment of the present invention is described. FIG. 13 is a sectional view for illustrating a configuration of the vehicle AC rotating machine 100 according to the second embodiment taken along the axial direction. Components having the same functions and operations as those of the first embodiment are denoted by the same reference symbols, and description thereof is omitted.

As illustrated in FIG. 13, the side surface 33c of each rotor magnet 33 located on the radially outer side thereof is fixed to the inner wall surface 32a of the insertion hole 32 opposed to the side surface 33c. Further, the side surface 33d of each rotor magnet 33 located on the radially inner side thereof is fixed to the inner wall surface 42b of the recessed portion 42 opposed to the side surface 33c. As described above, in each of the rotor magnets 33, the side surface 33c to be fixed to the rotor core 31, and the side surface 33d to be fixed to the axial end part 40 are surfaces other than the axial end surface 33a and the axial end surface 33b.

According to the second embodiment, in each of the rotor magnets 33, the side surface 33d to be fixed to the axial end part 40 is a surface other than the axial end surfaces. Thus, against a centrifugal force toward the radially outer side generated at the time of rotation of the rotor 30, each of the rotor magnets 33 can be firmly fixed at the side surface 33c or the side surface 33d. Therefore, resistance of the rotor 30 against the centrifugal force can be improved.

Third Embodiment

Figure 14:
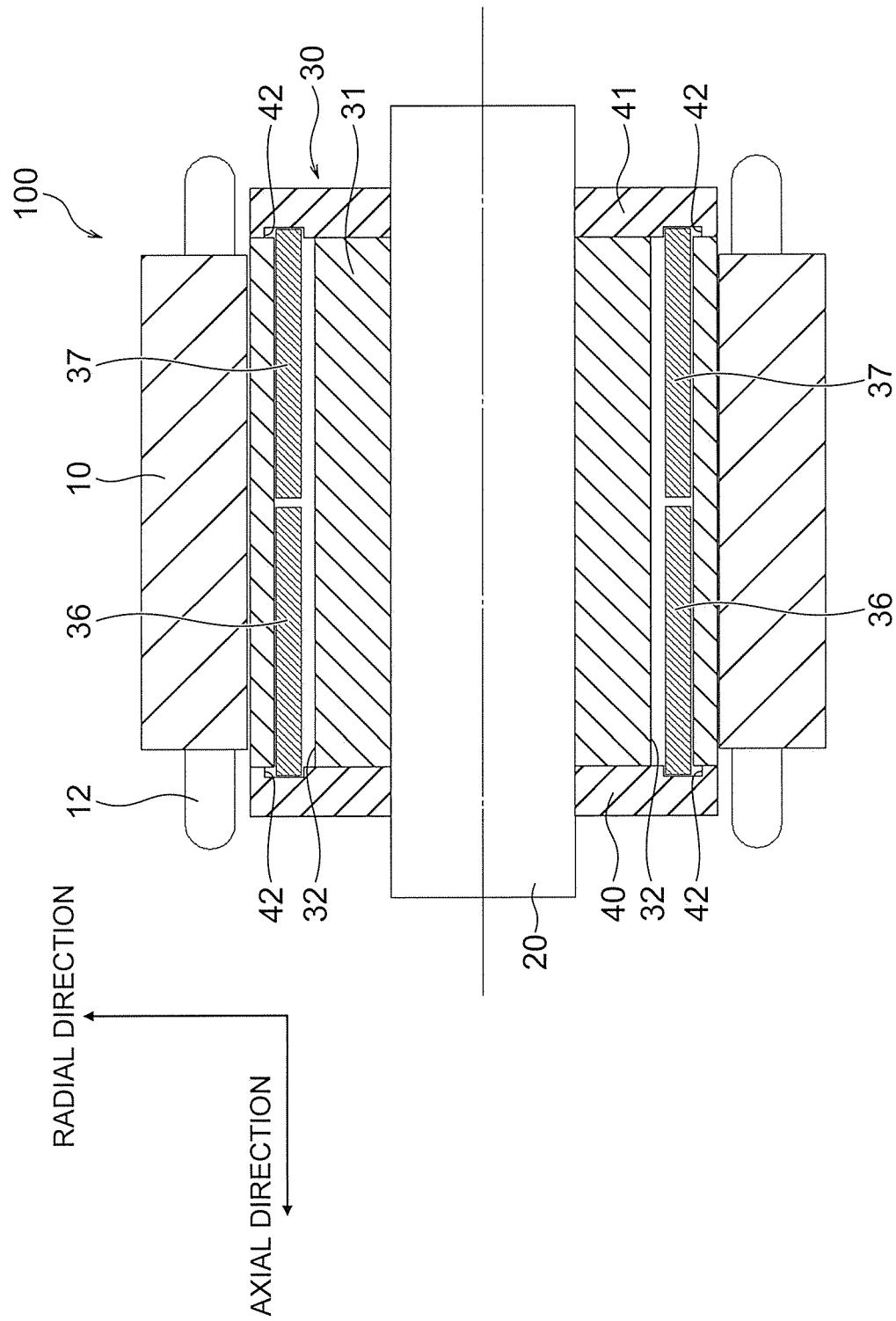
FIG. 14 is a sectional view for illustrating a configuration of the vehicle AC rotating machine according to a third embodiment of the present invention taken along the axial direction.

A rotating electric machine according to a third embodiment of the present invention is described. FIG. 14 is a sectional view for illustrating a configuration of the vehicle AC rotating machine 100 according to the third embodiment taken along the axial direction. Components having the same functions and operations as those of the first or second embodiment are denoted by the same reference symbols, and description thereof is omitted.

As illustrated in FIG. 14, in the third embodiment, the plurality of rotor magnets divided in the axial direction are inserted into the insertion hole 32. For example, there are provided two divided rotor magnets, specifically, a rotor magnet arranged closer to the axial end part 40 in the axial direction, and a rotor magnet 37 arranged closer to the axial end part 41 in the axial direction.

According to the third embodiment, the rotor magnets 36 and 37 are divided in the axial direction, thereby being capable of reducing eddy-current loss of the rotor magnets 36 and 37 generated through interlinkage of excitation magnetic flux produced by the stator winding 12. Therefore, output of the vehicle AC rotating machine 100 can be increased.

Further, when three or more rotor magnets are divided in the axial direction, it is sufficient if a surface of the rotor magnet is fixed to the axial end part 40 to be provided only on, of the plurality of divided rotor magnets, the rotor magnet arranged closest to the axial end part 40 in the axial direction. Similarly, it is sufficient if a surface of the rotor magnet is fixed to the axial end part 41 to be provided only on, of the plurality of divided rotor magnets, the rotor magnet arranged closest to the axial end part 41 in the axial direction. Accordingly, it is not required that a rotor magnet other than the two rotor magnets arranged closer to axial ends include a surface to be fixed to the axial end part 40 or the axial end part 41. Thus, the rotor magnets arranged closer to the axial ends, and the other rotor magnet can be different from each other in width dimension of a side surface perpendicular to the magnetization direction. Therefore, according to the third embodiment, through use of the common axial end parts 40 and 41, the vehicle AC rotating machines 100 having different magnetic characteristics can be realized.

As described above, in the vehicle AC rotating machine 100 according to the third embodiment, the plurality of rotor magnets 36 and 37 are divided in the axial direction. With this configuration, eddy-current loss of the rotor magnets 36 and 37 can be reduced, and hence the output of the vehicle AC rotating machine 100 can be increased.

Fourth Embodiment

Figure 15:
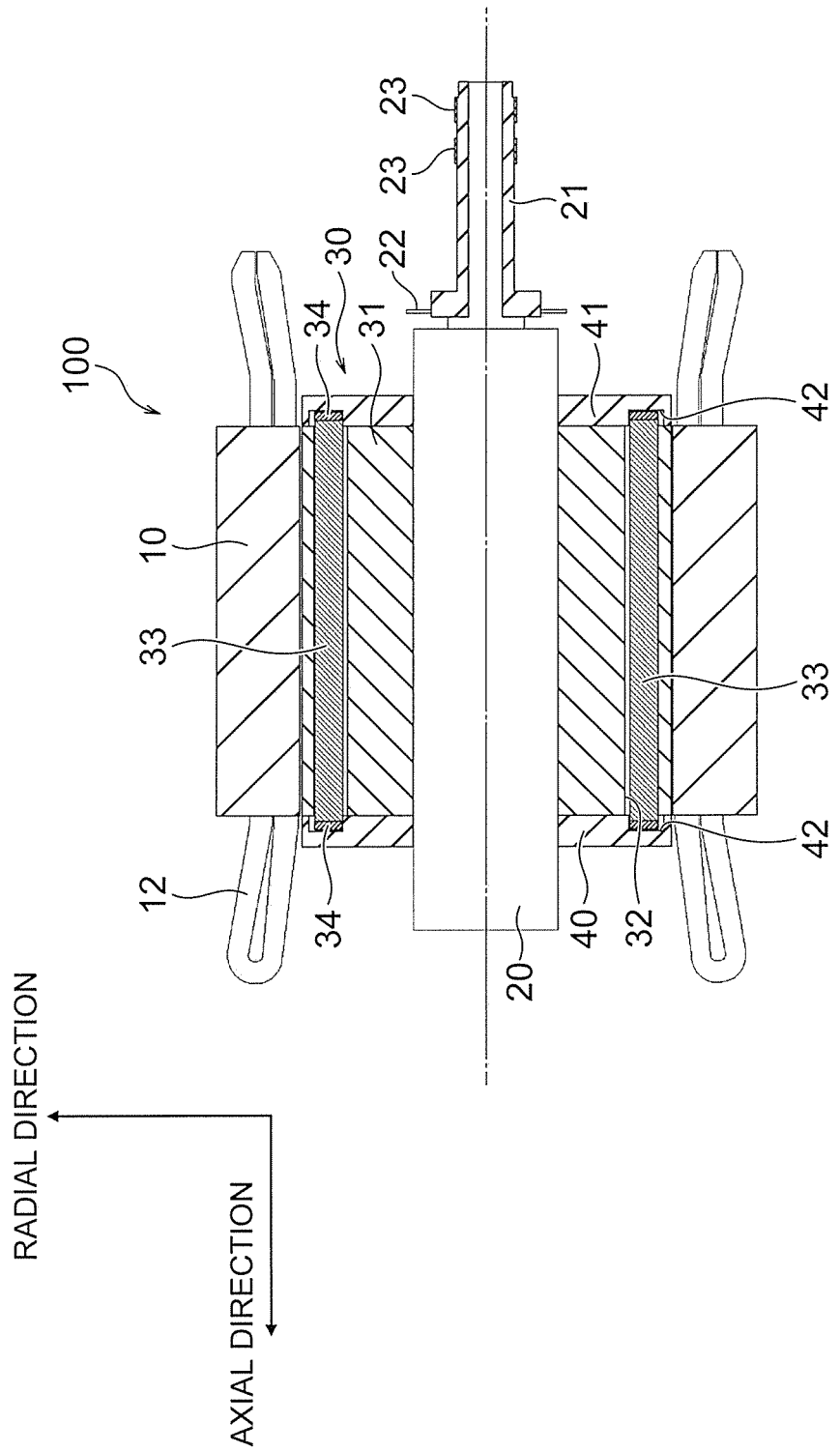
FIG. 15 is a sectional view for illustrating a configuration of the vehicle AC rotating machine according to a fourth embodiment of the present invention taken along the axial direction.

A rotating electric machine according to a fourth embodiment of the present invention is described. FIG. 15 is a sectional view for illustrating a configuration of the vehicle AC rotating machine 100 according to the fourth embodiment of the present invention taken along the axial direction. Components having the same functions and operations as those of one of the first, second, or third embodiment are denoted by the same reference symbols, and description thereof is omitted.

As illustrated in FIG. 15, the rotor 30 includes a rotor winding 34. The rotor winding 34 is coiled around the rotor magnets 33, and is inserted into the insertion holes 32 of the rotor core 31 together with the rotor magnets 33.

A slip ring holding part 21 is provided at an axial end portion of the shaft 20, and is rotated together with the shaft 20. The slip ring holding part 21 includes slip rings 23 and connection terminals 22. The slip rings 23 are brought into contact with a brush (not shown). The connection terminals 22 are electrically connected to the slip rings 23, and electrically connected to the rotor winding 34. The DC power or the AC power is supplied from an external power source to the rotor winding 34 through the slip rings 23 and the connection terminals 22. Thus, a magnetomotive force of the rotor 30 is adjusted.

As described above, in the vehicle AC rotating machine 100 according to the fourth embodiment, the rotor 30 further includes the rotor winding 34 coiled around the rotor magnets 33 and inserted into the insertion holes 32 together with the rotor magnets 33. With this configuration, based on an amount of an electric current caused to flow through the rotor winding 34, the magnetic flux produced by the rotor 30 can be adjusted. Accordingly, desired output of the rotating machine can be obtained in the vehicle AC rotating machine 100.

Fifth Embodiment

Figure 16:
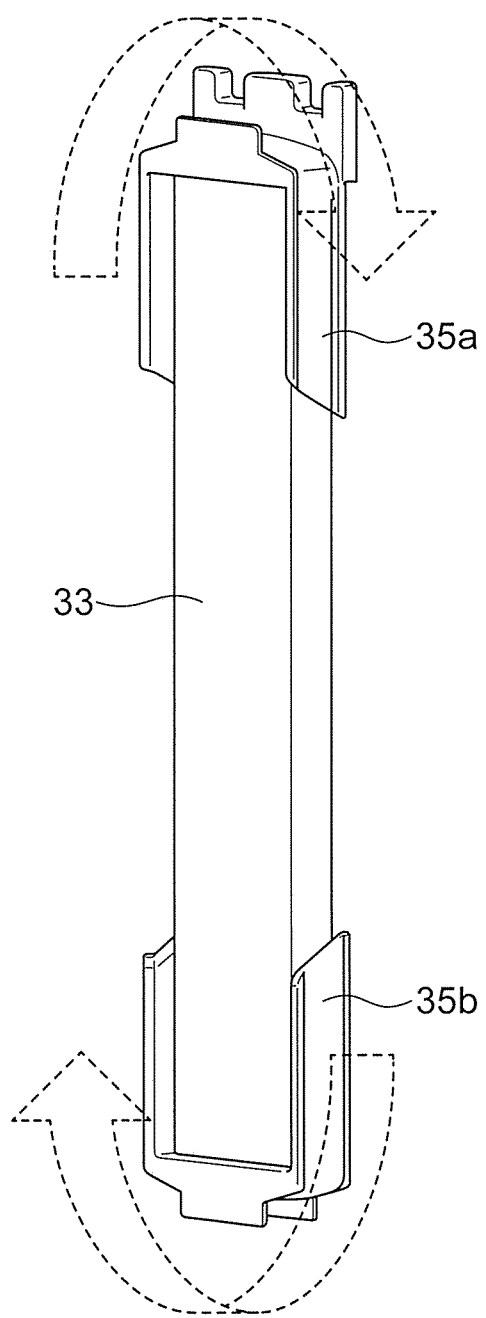
FIG. 16 is a perspective view for illustrating configurations of the rotor magnet and a pair of winding coiling parts of the vehicle AC rotating machine according to a fifth embodiment of the present invention.

A rotating electric machine according to a fifth embodiment of the present invention is described. FIG. 16 is a perspective view for illustrating configurations of the rotor magnet 33 and a pair of winding coiling parts 35a and 35b of the vehicle AC rotating machine 100 according to the fifth embodiment. The thick dotted arrow in FIG. 16 indicates a direction of coiling the rotor winding 34. Components having the same functions and operations as those of one of the first, second, third, or fourth embodiment are denoted by the same reference symbols, and description thereof is omitted.

As illustrated in FIG. 16, the pair of winding coiling parts 35a and 35b are mounted to both axial end portions of the rotor magnet 33, respectively. The rotor winding 34 is coiled around the rotor magnet 33 and the pair of winding coiling parts 35a and 35b. The rotor magnet 33 and the pair of winding coiling parts 35a and 35b around which the rotor winding 34 is coiled are inserted into the insertion hole 32 of the rotor core 31.

Each of the winding coiling parts 35a and 35b functions as the axial end part provided at the axial end portion of the rotor core 31. That is, each of the winding coiling parts 35a and 35b has a recessed portion in which the axial end portion of the rotor magnet 33 is to be inserted.

As described above, in the vehicle AC rotating machine 100 according to the fifth embodiment, the axial end part is the winding coiling part 35a or 35b mounted to the end portion of the rotor magnet 33 in the axial direction, and the rotor winding 34 is coiled around the winding coiling part. With this configuration, even when the dimension of each rotor magnet 33 is changed to increase the area of the side surface 33c, the shape of the rotor core 31 can be standardized, and hence the manufacturing mold for the rotor core 31 can be standardized. Further, with this configuration, via a heat transfer path formed by the rotor winding 34 having high thermal conductivity, heat generated in the rotor magnets 33 can be efficiently radiated to the outside. Therefore, heat radiation property of the rotor 30 can be improved.

Sixth Embodiment

Figure 17:
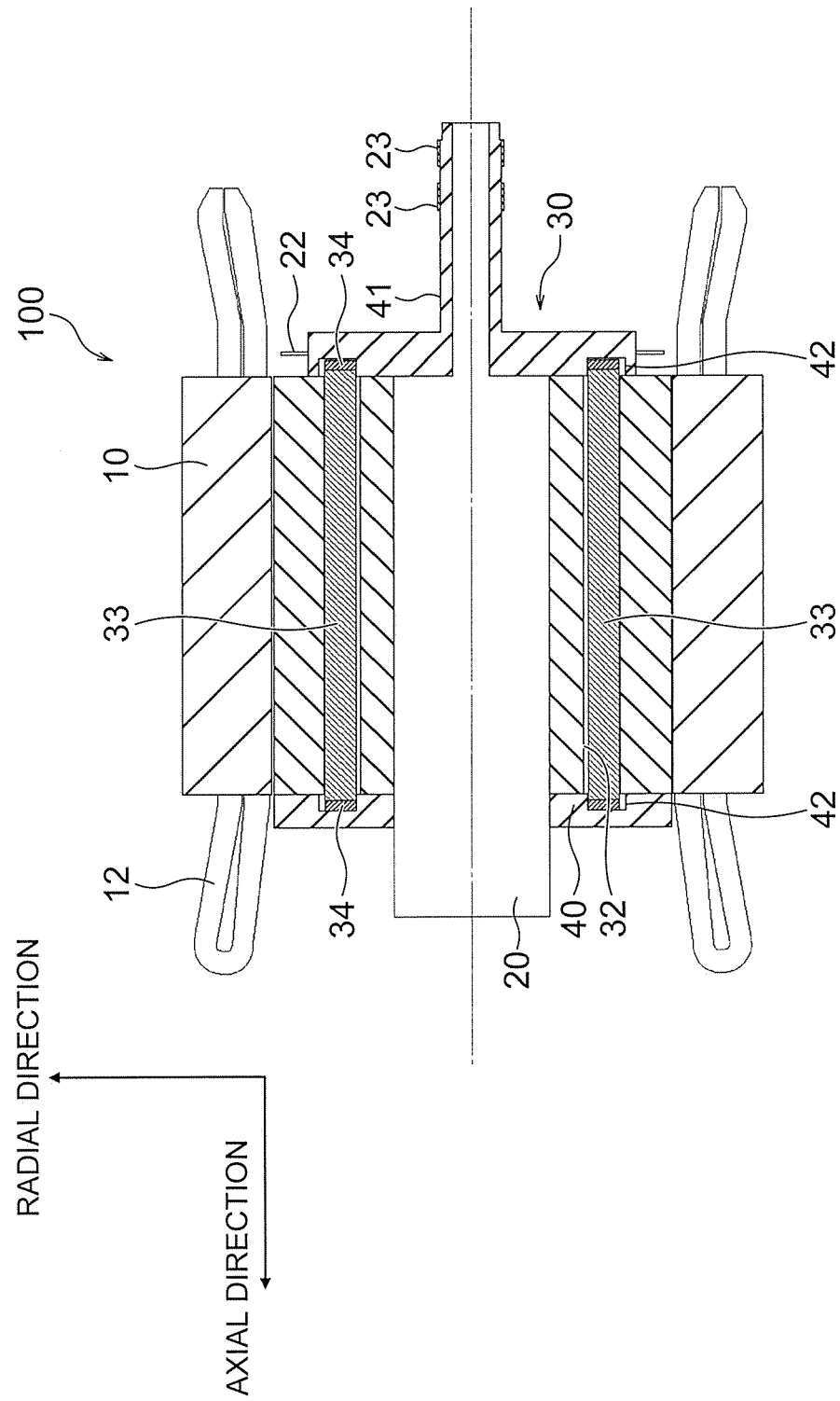
FIG. 17 is a sectional view for illustrating a configuration of the vehicle AC rotating machine according to a sixth embodiment of the present invention taken along the axial direction.
Figure 18:
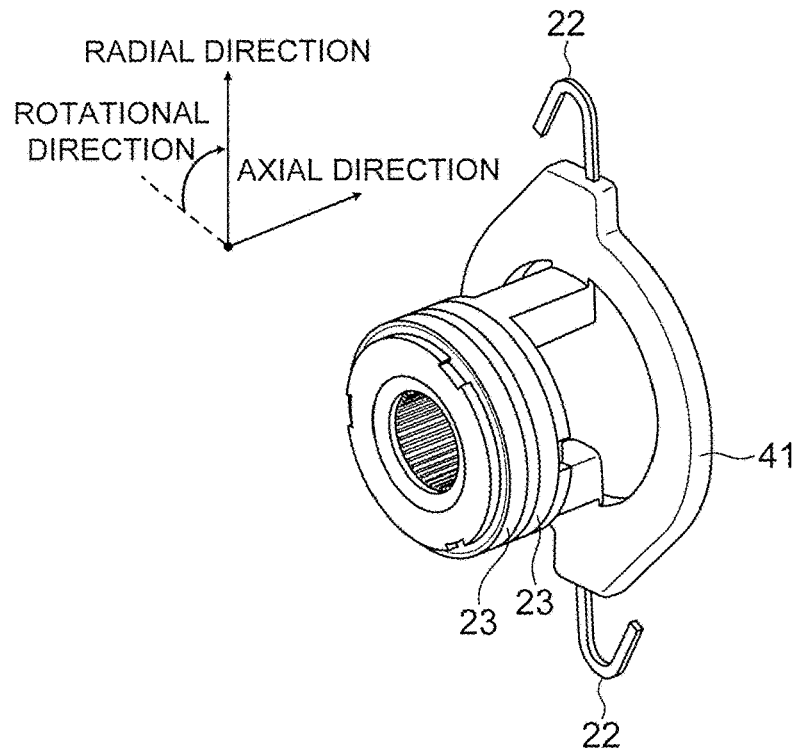
FIG. 18 is a perspective view for illustrating a configuration of the axial end part of the vehicle AC rotating machine according to the sixth embodiment of the present invention.
Figure 19:
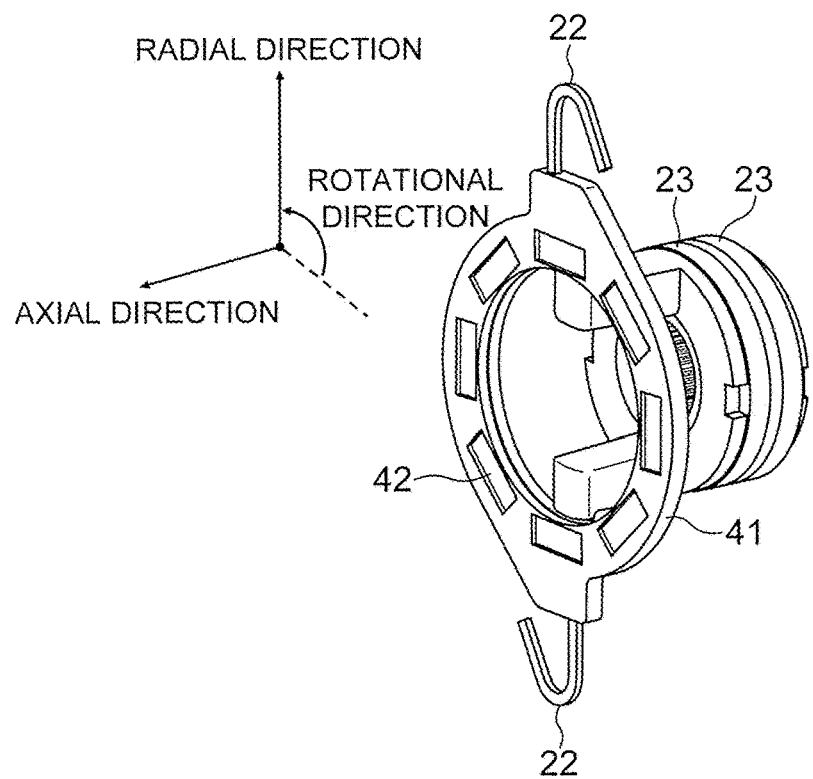
FIG. 19 is a perspective view for illustrating the configuration of the axial end part of the vehicle AC rotating machine according to the sixth embodiment of the present invention.

A rotating electric machine according to a sixth embodiment of the present invention is described. FIG. 17 is a sectional view for illustrating a configuration of the vehicle AC rotating machine 100 according to the sixth embodiment taken along the axial direction. FIG. 18 and FIG. 19 are perspective views for illustrating a configuration of the axial end part 41 of the vehicle AC rotating machine 100 according to the sixth embodiment. Components having the same functions and operations as those of one of the first, second, third, fourth, or fifth embodiment are denoted by the same reference symbols, and description thereof is omitted.

As illustrated in FIG. 17 to FIG. 19, the axial end part 41 includes the recessed portions 42 in which the end portions of the rotor magnets 33 in the axial direction are to be inserted, respectively. The axial end part 41 in the sixth embodiment includes eight recessed portions 42. The axial end part 41 further includes the slip rings 23 and the connection terminals 22. The slip rings 23 are brought into contact with a brush (not shown). The connection terminals 22 are electrically connected to the slip rings 23, and electrically connected to the rotor winding 34. The DC power or the AC power is supplied from an external power source to the rotor winding 34 through the slip rings 23 and the connection terminals 22. That is, the axial end part 41 functions as a path for supplying power to the rotor winding 34 as well as functions to hold the rotor magnets 33.

As described above, in the vehicle AC rotating machine 100 according to the sixth embodiment, the axial end part 41 includes the slip rings 23, and the connection terminals 22 that are electrically connected to the slip rings 23 and electrically connected to the rotor winding 34. With this configuration, the function of holding the rotor magnets 33, and the function as the path for supplying power to the rotor winding 34 can be realized by a single part, thereby being capable of reducing the number of parts of the vehicle AC rotating machine 100.

Seventh Embodiment

Figure 20:
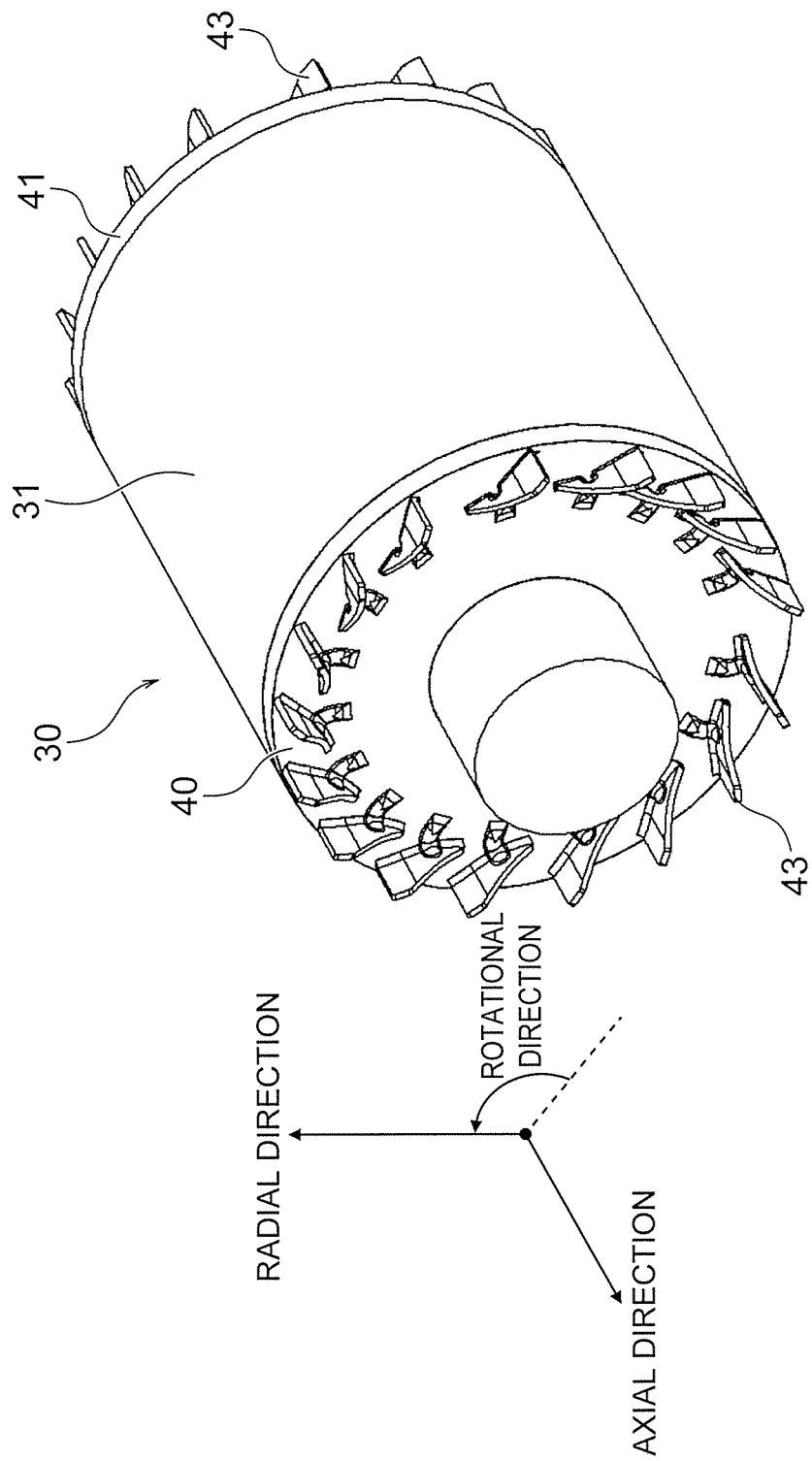
FIG. 20 is a perspective view for illustrating a configuration of the rotor of the vehicle AC rotating machine according to a seventh embodiment of the present invention.
Figure 21:
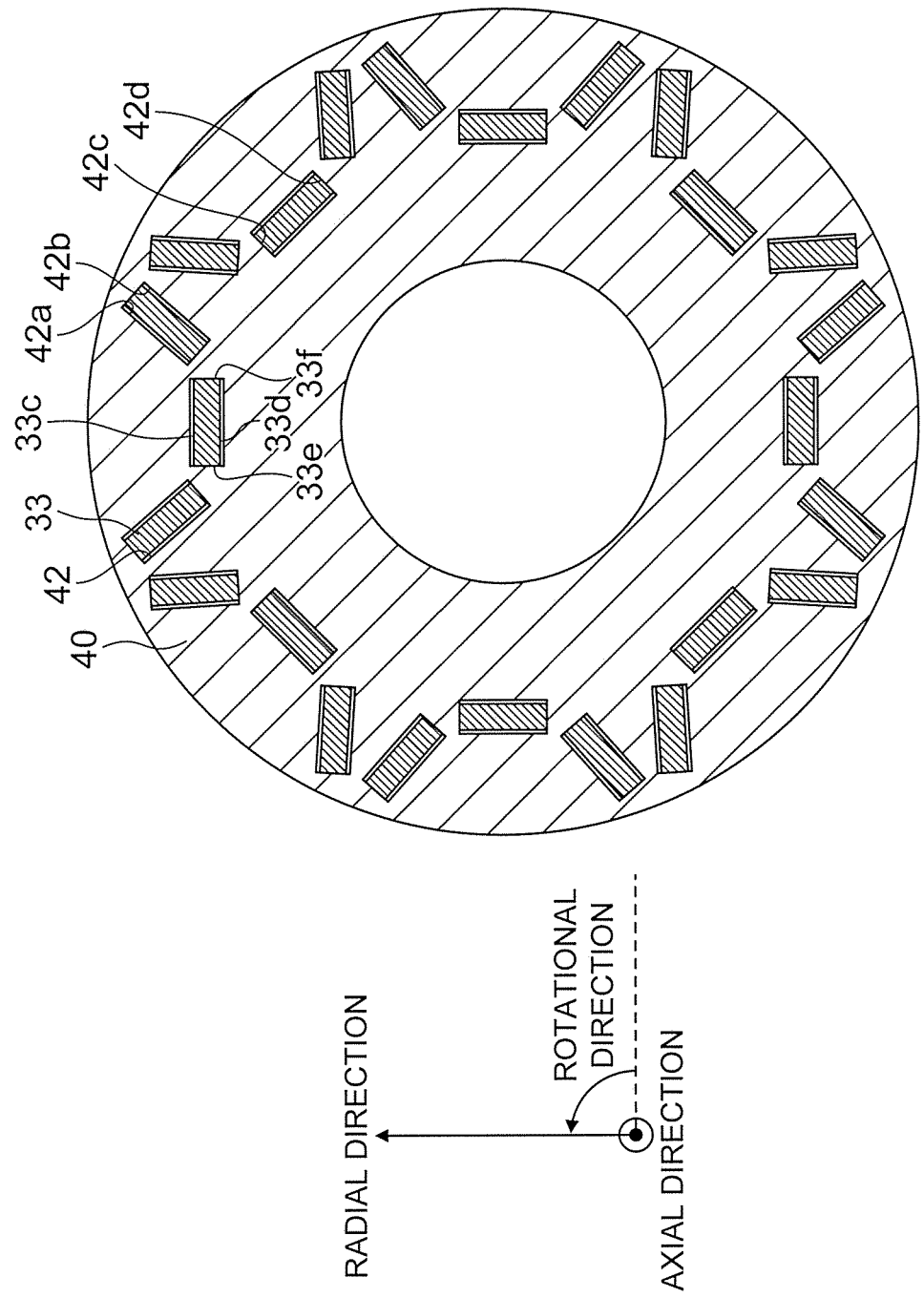
FIG. 21 is a sectional view for illustrating a configuration of the axial end part of the vehicle AC rotating machine according to the seventh embodiment of the present invention taken along the direction perpendicular to the axial direction.

A rotating electric machine according to a seventh embodiment of the present invention is described. FIG. 20 is a perspective view for illustrating a configuration of the rotor of the vehicle AC rotating machine 100 according to the seventh embodiment. FIG. 21 is a sectional view for illustrating a configuration of the axial end part 40 of the vehicle AC rotating machine 100 according to the seventh embodiment taken along the direction perpendicular to the axial direction. Components having the same functions and operations as those of one of the first, second, third, fourth, fifth, or sixth embodiment are denoted by the same reference symbols, and description thereof is omitted.

As illustrated in FIG. 20 and FIG. 21, a plurality of fins 43 configured to cause forced convection of air are formed on an outer surface of the axial end part 40 and an outer surface of the axial end part 41 in the axial direction. The plurality of fins 43 are arrayed at equal intervals along the rotational direction of the rotor 30. Each of the plurality of fins 43 functions as a blade of a centrifugal fan or a mixed flow fan. When the plurality of fins 43 are rotated along with rotation of the rotor 30, the forced convection of air is caused, thereby cooling the rotor 30 through heat exchange with the air. That is, each of the axial end part 40 and the axial end part 41 has a function of cooling the rotor 30 as well as the function of holding the rotor magnets 33. Thus, heat generated in the rotor magnets 33 can be efficiently radiated to the outside, thereby being capable of improving heat radiation property of the rotor 30.

As described above, in the vehicle AC rotating machine 100 according to the seventh embodiment, the axial end part 40 includes the plurality of fins 43 configured to cause forced convection of air. With this configuration, heat generated in the rotor magnets 33 can be efficiently radiated to the outside, thereby being capable of improving heat radiation property of the rotor 30.

Eighth Embodiment

Figure 22:
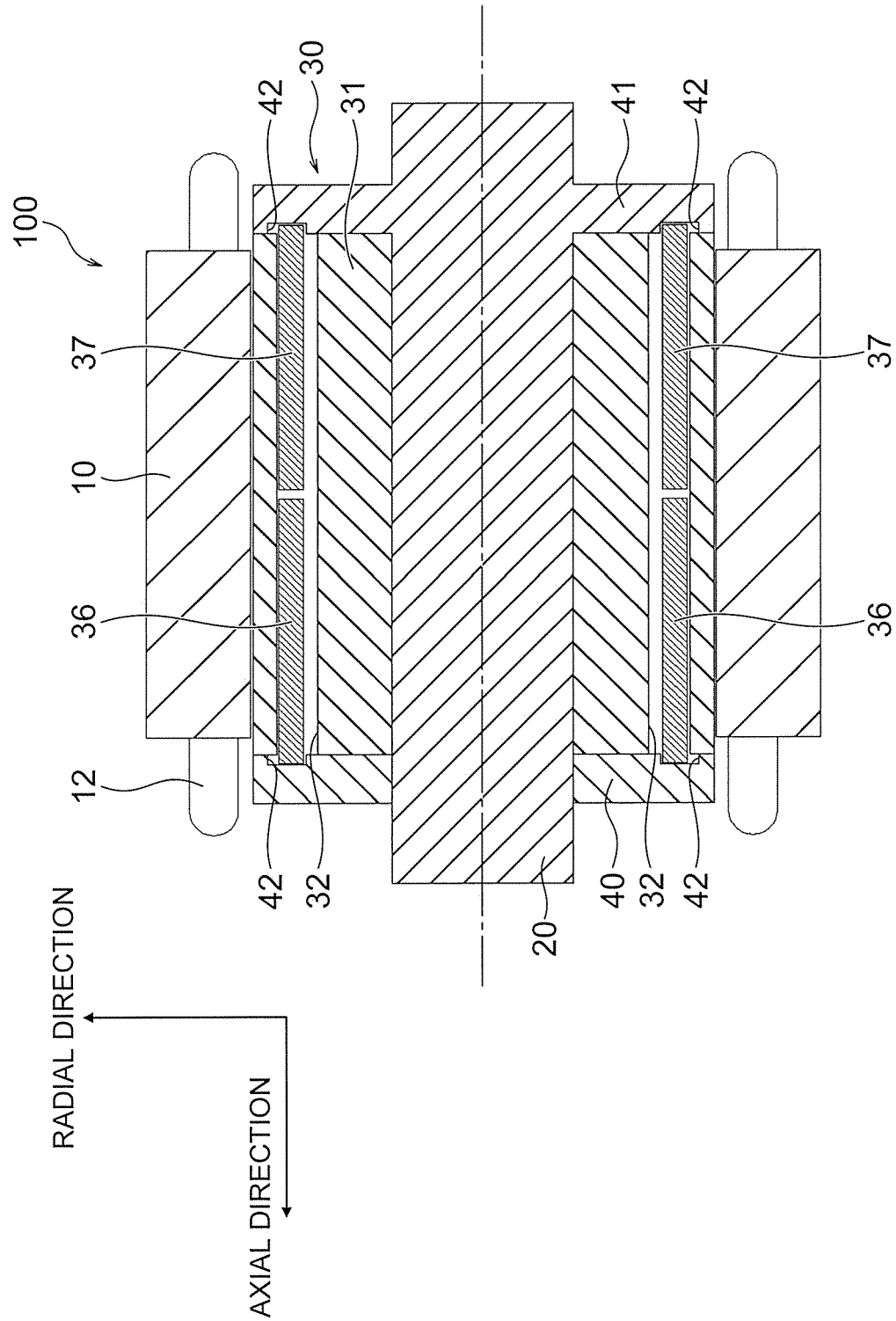
FIG. 22 is a sectional view for illustrating a configuration of the vehicle AC rotating machine according to an eighth embodiment of the present invention taken along the axial direction.

A rotating electric machine according to an eighth embodiment of the present invention is described. FIG. 22 is a sectional view for illustrating a configuration of the vehicle AC rotating machine 100 according to the eighth embodiment taken along the axial direction. Components having the same functions and operations as those of one of the first, second, third, fourth, fifth, sixth, or seventh embodiment are denoted by the same reference symbols, and description thereof is omitted.

As illustrated in FIG. 22, the axial end part 41 has the structure integrated with the shaft 20. That is, the axial end part 41 and the shaft 20 are formed by integral molding. Thus, thermal resistance between the axial end part 41 and the shaft 20 is reduced, and hence heat generated in the rotor magnets 36 and 37 is efficiently radiated to the bearing, the front bracket, and the rear bracket through the axial end part 41 and the shaft 20. Therefore, heat radiation property of the rotor 30 can be improved. In the eighth embodiment, the axial end part 41 has the structure integrated with the shaft 20, but the axial end part 40 may have the structure integrated with the shaft 20. Further, in the eighth embodiment, the two rotor magnets 36 and 37 are provided. However, similarly to the first embodiment, one rotor magnet 33 may be provided.

As described above, in the vehicle AC rotating machine 100 according to the eighth embodiment, the rotor 30 further includes the shaft 20 provided on the inner peripheral side of the rotor core 31. The axial end part 41 has the structure integrated with the shaft 20. With this configuration, heat radiation property of the rotor 30 can be improved.

Ninth Embodiment

Figure 23:
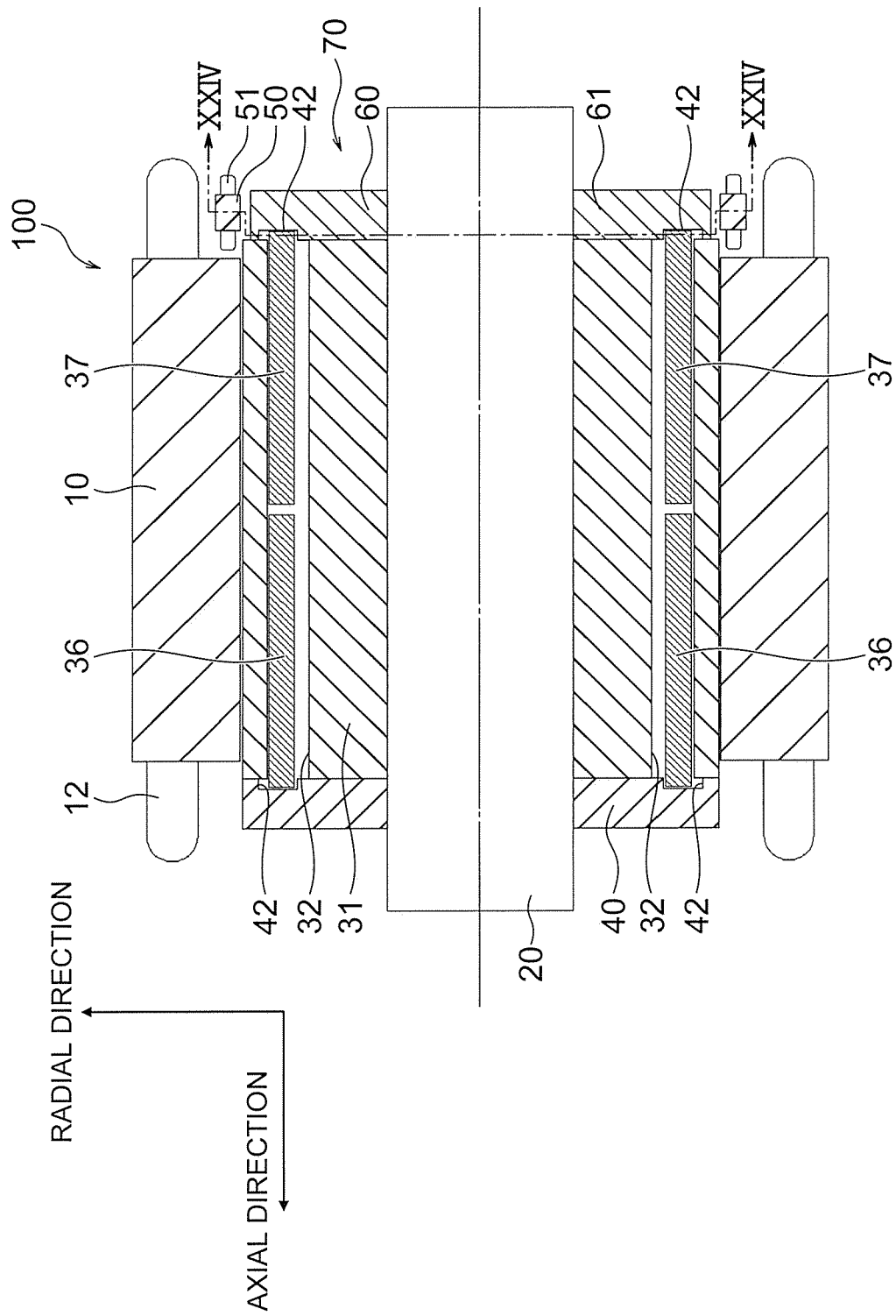
FIG. 23 is a sectional view for illustrating a configuration of the vehicle AC rotating machine according to a ninth embodiment of the present invention taken along the axial direction.
Figure 24:
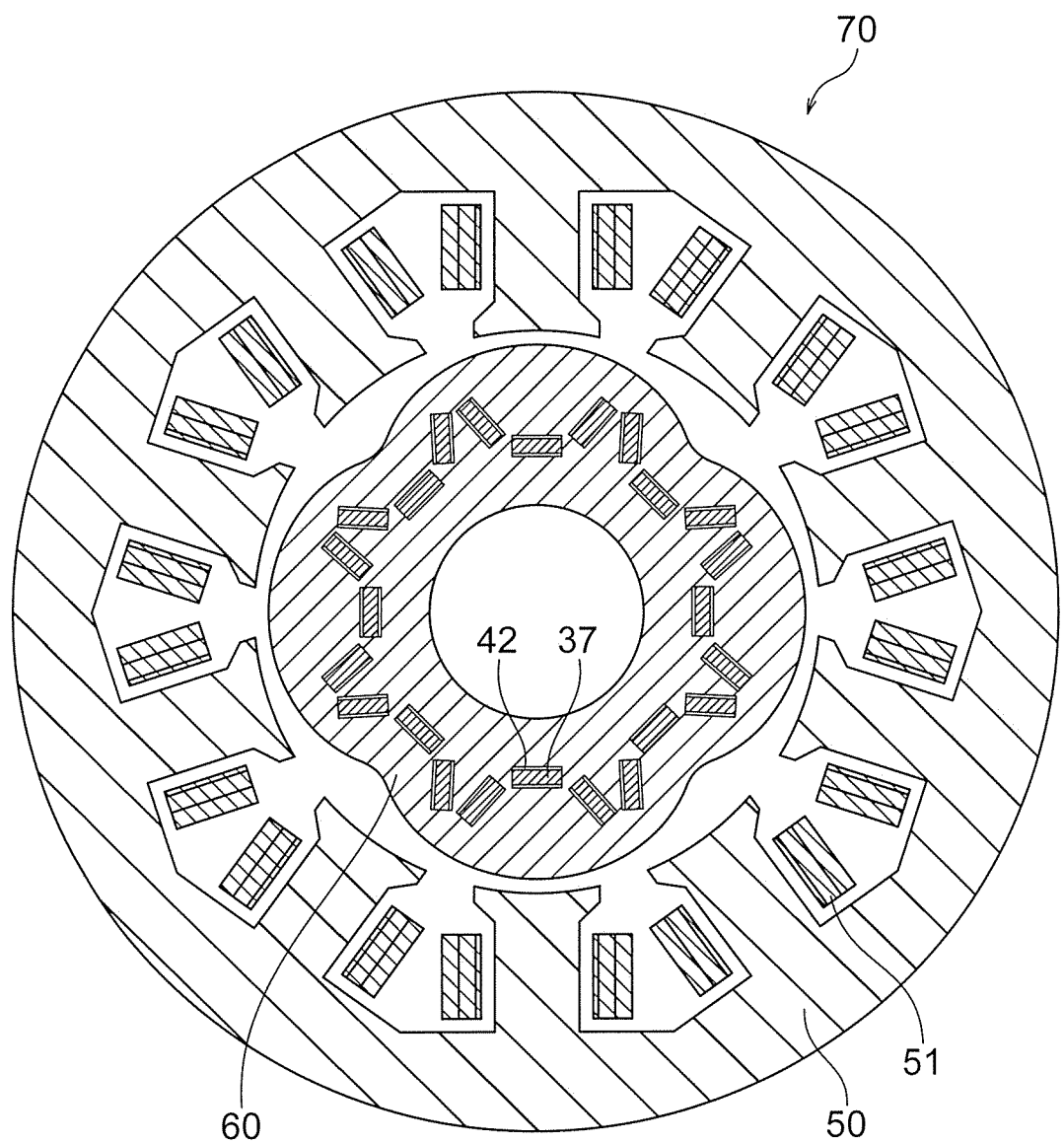
FIG. 24 is a sectional view for illustrating a cross section taken along the line XXIV-XXIV of FIG. 23.

A rotating electric machine according to a ninth embodiment of the present invention is described. FIG. 23 is a sectional view for illustrating a configuration of the vehicle AC rotating machine 100 according to the ninth embodiment taken along the axial direction. FIG. 24 is a sectional view for illustrating a cross section taken along the line XXIV-XXIV of FIG. 23. Components having the same functions and operations as those of one of the first, second, third, fourth, fifth, sixth, seventh, or eighth embodiment are denoted by the same reference symbols, and description thereof is omitted.

As illustrated in FIG. 23 and FIG. 24, the vehicle AC rotating machine 100 includes a rotational position sensor 70 configured to detect a rotational position of the rotor 30. The rotational position sensor 70 includes a rotational-position-sensor rotor 60 and a rotational-position-sensor stator 50. The rotational-position-sensor rotor 60 includes a rotor core 61. The rotor core 61 is mounted to the axial end portion of the rotor core 31 of the rotor 30. The rotational-position-sensor stator 50 includes a plurality of stator windings 51. The rotational-position-sensor stator 50 is arranged so as to surround an outer periphery of the rotational-position-sensor rotor 60 with an air gap, and is mounted to the rear bracket or the front bracket of the vehicle AC rotating machine 100.

When the rotational-position-sensor rotor 60 is rotated together with the rotor 30, a magnetic flux density distribution in the air gap between the rotational-position-sensor rotor 60 and the rotational-position-sensor stator 50 varies so that an output voltage output from each of the stator windings 51 varies. Based on the output voltages, positions of magnetic poles of the rotor 30 are detected.

The rotational-position-sensor rotor 60 in the ninth embodiment also functions as the axial end part provided at the axial end portion of the rotor core 31. That is, the rotational-position-sensor rotor 60 includes the recessed portions 42 in which the end portions of the rotor magnets 37 in the axial direction are to be inserted, respectively. An axial depth of each of the recessed portions 42 is set so as to prevent the rotor magnet 37 and the rotational-position-sensor stator 50 from being opposed to each other in the radial direction. With this configuration, magnetic flux of the rotor magnets 37 has no influence on the rotational position sensor 70. In the ninth embodiment, the two rotor magnets 36 and 37 are provided. However, similarly to the first embodiment, one rotor magnet 33 may be provided.

As described above, the vehicle AC rotating machine 100 according to the ninth embodiment further includes the rotational position sensor 70 configured to detect the rotational position of the rotor 30. The axial end part is the rotational-position-sensor rotor 60 of the rotational position sensor 70. With this configuration, the function of holding the rotor magnets 33, and the function of detecting the rotational position of the rotor 30 can be realized by a single part, thereby being capable of reducing the number of parts of the vehicle AC rotating machine 100.

Each of the first to ninth embodiments described above may be carried out in various combinations.

REFERENCE SIGNS LIST 10 stator, 11 stator core, 12 stator winding, 20 shaft, 21 slip ring holding part, 22 connection terminal, 23 slip ring, 30 rotor, 31 stator core, 32 insertion hole, 32a, 32b, 32c, 32d inner wall surface, 33 rotor magnet, 33a, 33b axial end surface, 33c, 33d, 33e, 33f side surface, 34 rotor winding, 35a, 35b winding coiling part, 36, 37 rotor magnet, 40, 41 axial end part, 42 recessed portion, 43 fin, 50 rotational-position-sensor stator, 51 stator winding, 60 rotational-position-sensor rotor, 61 rotor core, 70 rotational position sensor, 100 vehicle AC rotating machine, 110 AC generator motor unit, 120 power circuit unit, 130 battery, 140 control circuit unit

The invention claimed is:
1. A rotating electric machine, comprising:
a stator; and
a rotor provided so as to be rotatable relative to the stator, wherein the rotor includes:
  a rotor core;
  an axial end part provided at an end portion of the rotor core in an axial direction of the rotor; and
  a rotor magnet that is inserted into an insertion hole formed so as to pass through the rotor core in the axial direction, and is fixed to both of the rotor core and the axial end part,
wherein the axial end part has a recessed portion in which an end portion of the rotor magnet in the axial direction is to be inserted,
wherein the rotor magnet includes, as side surfaces along the axial direction, a first side surface and a second side surface different from the first side surface,
wherein the first side surface is, of the two side surfaces perpendicular to a magnetization direction of the rotor magnet, the side surface located on an outer side in a radial direction of the rotor, wherein the second side surface is the side surface parallel to the magnetization direction of the rotor magnet, wherein the first side surface is fixed to a first inner wall surface of the insertion hole opposed to the first side surface, wherein in a cross section perpendicular to the axial direction, a width of the first inner wall surface along the first side surface is larger than a width of the first side surface, wherein the second side surface is fixed to a second inner wall surface of the recessed portion opposed to the second side surface, wherein in the cross section perpendicular to the axial direction, a width of the second inner wall surface along the second side surface is larger than a width of the second side surface, wherein the rotor magnet is fixed to the rotor core through surface joining between the first side surface and the first inner wall surface, wherein the rotor magnet is fixed to the axial end part through surface joining between the second side surface and the second inner wall surface, and wherein the first side surface is arranged so as to be opposed to an inner wall surface of the recessed portion with an interspace between the first side surface and the inner wall surface.

2. The rotating electric machine according to claim 1, wherein the rotor magnet comprises a plurality of rotor magnets divided in the axial direction.

3. The rotating electric machine according to claim 1, wherein the axial end part includes a fin configured to cause forced convection of air.

4. The rotating electric machine according to claim 1, wherein the rotor further includes a shaft provided on an inner peripheral side of the rotor core, and
wherein the axial end part has the structure integrated with the shaft.

5. The rotating electric machine according to claim 1, further comprising a rotational position sensor configured to detect a rotational position of the rotor,
wherein the axial end part is a rotational-position-sensor rotor of the rotational position sensor.

6. The rotating electric machine according to claim 1, wherein in the cross section perpendicular to the axial direction, the width of the first inner wall surface along the first side surface is larger than a width of the inner wall surface of the recessed portion that is opposed to the first side surface and extends along the first side surface in the cross section perpendicular to the axial direction.

7. A rotating electric machine, comprising:
a stator; and
a rotor provided so as to be rotatable relative to the stator, wherein the rotor includes:
a rotor core;
an axial end part provided at an end portion of the rotor core in an axial direction of the rotor;
a rotor magnet that is inserted into an insertion hole formed so as to pass through the rotor core in the axial direction, and is fixed to both of the rotor core and the axial end part; and
a rotor winding that is coiled around the rotor magnet, and is inserted into the insertion hole together with the rotor magnet,
wherein the axial end part has a recessed portion in which an end portion of the rotor magnet in the axial direction is to be inserted,
wherein the rotor magnet includes, as side surfaces along the axial direction, a first side surface and a second side surface different from the first side surface,
wherein the first side surface is fixed to a first inner wall surface of the insertion hole opposed to the first side surface,
wherein in a cross section perpendicular to the axial direction, a width of the first inner wall surface along the first side surface is larger than a width of the first side surface,
wherein the second side surface is fixed to a second inner wall surface of the recessed portion opposed to the second side surface, and
wherein in the cross section perpendicular to the axial direction, a width of the second inner wall surface along the second side surface is larger than a width of the second side surface.

8. The rotating electric machine according to claim 7, wherein the axial end part is a winding coiling part mounted to the end portion of the rotor magnet in the axial direction, and the rotor winding is coiled around the winding coiling part.

9. The rotating electric machine according to claim 7, wherein the axial end part includes a slip ring, and a connection terminal that is electrically connected to the slip ring and electrically connected to the rotor winding.

10. The rotating electric machine according to claim 7, wherein the first side surface is, of the two side surfaces perpendicular to a magnetization direction of the rotor magnet, the side surface located on an outer side in a radial direction of the rotor, and
wherein the second side surface is the side surface parallel to the magnetization direction of the rotor magnet.

11. The rotating electric machine according to claim 7, wherein the first side surface is arranged so as to be opposed to an inner wall surface of the recessed portion with an interspace between the first side surface and the inner wall surface.

* * * * *